US010445774B2

(12) United States Patent
Reese et al.

(10) Patent No.: US 10,445,774 B2
(45) Date of Patent: Oct. 15, 2019

(54) GEOTARGETING OF CONTENT BY DYNAMICALLY DETECTING GEOGRAPHICALLY DENSE COLLECTIONS OF MOBILE COMPUTING DEVICES

(71) Applicant: RetailMeNot, Inc., Austin, TX (US)

(72) Inventors: David John Reese, Austin, TX (US); Annette Taberner-Miller, Austin, TX (US); Lipphei Adam, Austin, TX (US); Rachel Renee Bell, Austin, TX (US); Nicholas James Shiffert, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 767 days.

(21) Appl. No.: 15/072,616

(22) Filed: Mar. 17, 2016

(65) Prior Publication Data
US 2016/0196577 A1    Jul. 7, 2016

Related U.S. Application Data

(63) Continuation-in-part of application No. 14/619,756, filed on Feb. 11, 2015.

(60) Provisional application No. 62/134,862, filed on Mar. 18, 2015, provisional application No. 61/939,990, filed on Feb. 14, 2014.

(51) Int. Cl.
| *G06Q 30/02* | (2012.01) |
| *H04W 4/021* | (2018.01) |
| *H04W 4/029* | (2018.01) |
| *H04L 29/08* | (2006.01) |
| *H04W 4/02* | (2018.01) |

(52) U.S. Cl.
CPC ..... *G06Q 30/0252* (2013.01); *G06Q 30/0259* (2013.01); *G06Q 30/0261* (2013.01); *G06Q 30/0267* (2013.01); *H04L 67/02* (2013.01); *H04L 67/20* (2013.01); *H04L 67/26* (2013.01); *H04W 4/021* (2013.01); *H04W 4/023* (2013.01); *H04W 4/029* (2018.02)

(58) Field of Classification Search
CPC ....................................... G06Q 30/0207–0277
USPC .............................................. 705/14.1–14.73
See application file for complete search history.

(56) References Cited

U.S. PATENT DOCUMENTS

| 2013/0317944 | A1* | 11/2013 | Huang ................. G01S 5/0252 705/26.61 |
| 2014/0025755 | A1* | 1/2014 | Hughes ................. G06Q 10/10 709/206 |
| 2014/0122040 | A1* | 5/2014 | Marti ................. G06F 17/5009 703/6 |

* cited by examiner

*Primary Examiner* — Sam Refai
(74) *Attorney, Agent, or Firm* — Pillsbury Winthrop Shaw Pittman LLP

(57) ABSTRACT

Provided is a process of selectively providing content to computing devices based on geographic proximity to dynamically detected events drawing crowds, the process including: obtaining, with one or more computers, data indicative of current geolocations of more than 5,000 mobile computing devices based on information reported by an application executing on the mobile computing devices; inferring, with one or more computers, that an event with a crowd is occurring based on the data indicative of the geolocations indicating an amount of people and a proximity of the people; selecting, with one or more computers, content in response to the inference; and sending, with one or more computers, the selected content to one or more user computing devices for presentation based on proximity between the one or more user computing devices and a geographic location of the event with the crowd.

36 Claims, 15 Drawing Sheets

GEOTARGETING OF CONTENT BY DYNAMICALLY DETECTING GEOGRAPHICALLY DENSE COLLECTIONS OF MOBILE COMPUTING DEVICES

CROSS-REFERENCE TO RELATED APPLICATIONS

The present application claims the benefit of U.S. Provisional Patent Application 62/134,862, titled DYNAMIC-GEOLOCATION TARGETING OF OFFERS, filed 18 Mar. 2015, and is a continuation-in-part of U.S. patent application Ser. No. 14/619,756, titled EVENT-BASED OFFERS FOR A GEOFENCED GEOGRAPHIC AREA, filed 11 Feb. 2015, which claims the benefit of U.S. Provisional Patent Application 61/939,990, titled EVENT-BASED OFFERS FOR A GEOFENCED GEOGRAPHIC AREA, filed 14 Feb. 2014. The entire content of each of these parent applications is incorporated by reference.

BACKGROUND

1. Field

This invention relates generally to content distribution via distributed computing applications and more particularly to content distribution to geolocations at which events are inferred to be occurring based on data reported from mobile computing devices at the events.

2. Description of the Related Art

Content targeting according to geolocation is used for a variety of purposes. For instance, users may wish to view information on mobile devices, like cell phones, selected according to the user's current position, like reviews of nearby restaurants, offers (e.g., coupons or deals) for nearby merchants, and news stories pertaining to their geographic area. In many cases, content is selected based on the user's location (e.g., geotargeted) according to attributes of the user's geographic location (i.e., aspects of the location other than the geographic coordinates), like whether the user is in a particular type of store, or likely engaging in a particular activity known to occur at the geolocation.

Many systems for targeting content according to attributes of geolocations require that geographic areas be labeled in advance. For instance, business listings and geographic information systems often include extensive repositories of polygons defining the boundaries of various geographic areas (like stores, parks, bars, and restaurants) and attributes of those areas (like amenities and activities associated with the location). In many cases, extensive investments are made to construct these data collections by researching and tracking what sorts of activities and things are at the locations. Such systems, however, do not work well for transient attributes of geolocations, like events where crowds form. In many cases, the event is over before the database can be updated.

Aggravating these issues, in many cases, wireless media near events is crowded and unreliable, and users often place extra strain on their battery when attending events, e.g., by repeatedly seeking access to the wireless media and to coordinate among friends. Thus, detecting events where people form crowds and geotargeting content into the geographic area quickly enough that the crowd has not dispersed, in a battery sensitive fashion, without reliable wireless communication is particularly difficult.

The problem is made all the more challenging by the risk of false positives. In many cases, it is desirable to target content to events based on those events signaling something unique and special about the attendees' experience, like a concert or sporting event, rather than a crowded morning commute. Yet, people form crowds in the course of going about their daily routine, and those crowds do not correspond to these events (e.g., transient special events) warranting content targeting. In both cases, i.e., routinely formed crowds and special events, the signals received by, and data emitted by, wireless mobile devices are similar and computationally challenging to distinguish.

SUMMARY

The following is a non-exhaustive listing of some aspects of the present techniques. These and other aspects are described in the following disclosure.

Some aspects include a process of selectively providing content to computing devices based on geographic proximity to dynamically detected events drawing crowds, the process including: obtaining, with one or more computers, data indicative of current geolocations of more than 5,000 mobile computing devices based on information reported by an application executing on the mobile computing devices; inferring, with one or more computers, that an event with a crowd is occurring based on the data indicative of the geolocations indicating an amount of people and a proximity of the people; selecting, with one or more computers, content in response to the inference; and sending, with one or more computers, the selected content to one or more user computing devices for presentation based on proximity between the one or more user computing devices and a geographic location of the event with the crowd.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
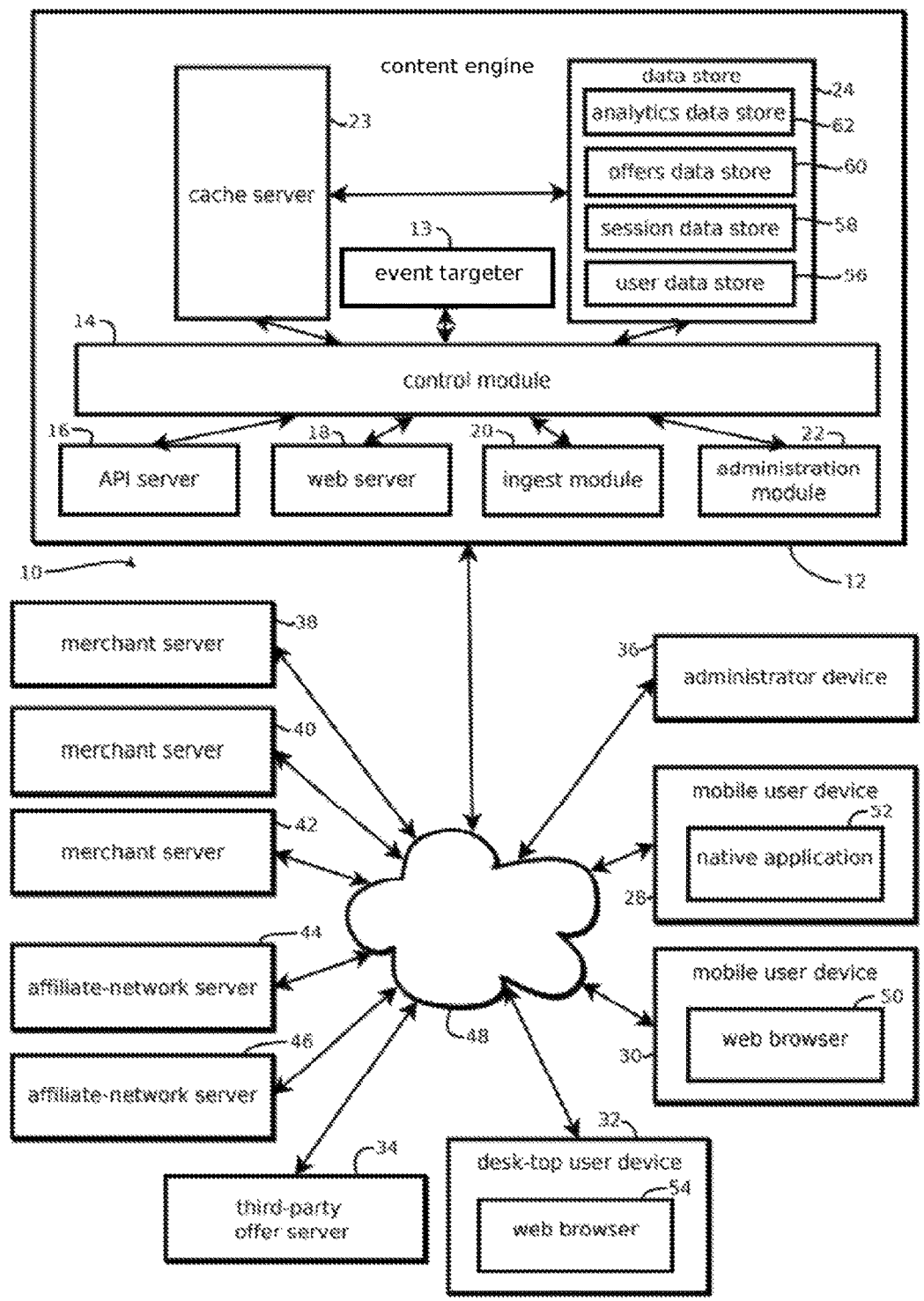
FIG. 1 illustrates an example of a content-discovery system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of content geotargeting. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As shown in FIG. 1, some embodiments include a content-discovery system 10 having a content engine 12 with an event targeter 13 that mitigates the issues described above. In some implementations, the event targeter 13 executes processes described below with reference to FIGS. 4-9. In doing so, some embodiments provide event-based content.

A variety of different types of content may be provided. For instance, local microblogs may be provided, reviews of nearby businesses may be provided, local search results may be provided, or offers redeemable at local merchants may be provided. For instance, event-based offers may be created in response to a request for a merchant, and an event-based offer may be associated with event criteria that define when an event-based offer is to be provided to users. Mobile user devices of users attending an event may cross an event geofence around an event venue. Event data associated with an event may be obtained, and event-based content (like an offer, review, search result, microblog post, etc.) may be sent to the mobile user devices within the event geofence if the event data meets the event criteria. The event-based content may include, for example, time-limited thresholds, trigger-based thresholds, and post-event exclusive content.

The techniques are best illustrated with content that varies widely in relevance to users based on the user's location. Accordingly, examples are described with reference to offers created and provided according to geolocation, but the techniques are not limited to offers, nor are the claims directed to the creation, formation, or provision of offers unless offers are explicitly recited (which is not to suggest that claim scope may not encompass such subject matter, merely that it is not the subset matter to which the claims are directed).

In some instances, users may redeem an event-based offer at the event venue or save the event-based offer for redemption after the event and at a different location. Advantageously, the techniques described herein enable easier, more efficient, and faster distribution of event-based offers to large number of users, (e.g., greater than 5,000, greater than 10,000, greater than 15,000, greater than 20,000 users, greater than 30,000 users, and so on). In some instances, all such users and associated mobile user devices may receive an event-based offer at or a few seconds after event criteria are met. Additionally, the event-based offer techniques described herein enable merchants who do not have advertisements or sponsorships in an event venue to reach users at an event venue attending an event.

FIG. 1 shows an embodiment of the content-discovery system 10. The exemplary system 10 includes a content engine 12 that, in some embodiments, is capable of reducing the burden on users attempting to identify offers relevant to them from among a relatively large pool of offers (e.g., more than 100, more than 1,000, or more than 10,000). To this end and others, the content engine 12 maintains device-independent user profiles (or portions of user profiles) by which offers interfaces may be relatively consistently configured across multiple user devices with which the user interacts with the content engine 12. Further, the content engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The content engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. It should be noted, however, that not all embodiments necessarily provide all of the benefits outlined herein, and some embodiments may provide all or a subset of these benefits or different benefits, as various engineering and cost tradeoffs are envisioned.

In the illustrated embodiment, the content engine 12 includes a control module 14, an application program interface (API) server 16, a web server 18, an ingest module 20, an administration module 22, a data store 24, and a cache server 23. These components, in some embodiments, communicate with one another in order to provide the functionality of the content engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the content engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the content engine 12 operates, the illustrated embodiment of FIG. 1 includes a number of components with which the content engine 12 communicates: mobile user devices 28 and 30; a desk-top user device 32; a third party server 34; an administrator device 36; merchant servers 38, 40, and 42; and affiliate-network servers 44 and 46. Each of these devices communicates with the content engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native application 52. The native application 52, in some embodiments, is operative to provide an offers interface that communicates with the content engine 12 and facilitates user interaction with data from the content engine 12. Similarly, the web browser 50 may be configured to receive a website from the content engine 12 having data related to deals and instructions (for example, instructions expressed in JavaScript) that when executed by the browser (which is executed by the processor) cause the mobile user device to communicate with the content engine 12 and facilitate user interaction with data from the content engine 12. The native application 52 and the web browser 50, upon rendering a webpage from the content engine 12, may generally be referred to as client applications of the content engine 12, which in some embodiments may be referred to as a server. Embodiments, however, are not limited to client/server architectures, and the content engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the content engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the content engine 12.

Merchant servers 38, 40, and 42 host websites or other user accessible content interfaces by which users can accept offers hosted by the content engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the content engine 12 are expected to mitigate this burden.

Further, in some embodiments, the merchant servers 38, 40, and 42 provide data about offers to the content engine 12 or (i.e., and/or, as used herein, unless otherwise indicated) data about transactions involving offers. In use cases in which the operator of the content engine 12 has a direct affiliate-marketing relationship with one of the merchants of the merchant servers 38, 40, or 42, the transaction data may provide the basis for payments by the merchant directly to the operator of the content engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the content engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the content engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases. For example, many coupon codes are not affiliate specific and are shared across multiple affiliates, as the merchant may desire the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the content engine 12 in the web browsers 50 or 54, that webpage is configured by the content engine 12 to include instructions to engage the affiliate network server 44 or 46 when a user selects an offer, for example, by clicking on, touching, or otherwise registering a selection of an offer. The website provided by the content engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a localStorage object via a localStorage.setItem command) an identifier of the affiliate that provided the offer that was selected.

The webpage from the content engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the content engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the content engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the content engine 12 in this example) in client-side storage (e.g., in a cookie, localStorage object, or a database) of the mobile user device 28, and thereby navigating that browser to the merchant website. In other use cases, the operator of the content engine 12 has a direct relationship with the merchant issuing the offer, and the selection of an offer within the native application 52 or the desktop or mobile website of the content engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the content engine 12, e.g., during use by employees or agents of the entity operating the content engine 12. In some embodiments, the administration module 22 may communicate with the administrator device 36 to present an administration interface at the administrator device 36 by which an administrator may configure offers interfaces presented to users by the content engine 12. In some embodiments, the administrator may enter offers into the content engine 12; delete offers from the content engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the content engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The content engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the content engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the content engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the content engine 12.

In this embodiment, the session data store 58 stores a plurality of session records, each record including information about a session a given user is having or has had with the content engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the content engine 12 or whether the merchant compensates the operator of the content engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the content engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the content engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the content engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the content engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the content engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the content engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the content engine 12 are depicted as discrete functional blocks, but embodiments are not limited to systems in which the functionality described herein is organized as illustrated by FIG. 1. The functionality provided by each of the components of the content engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
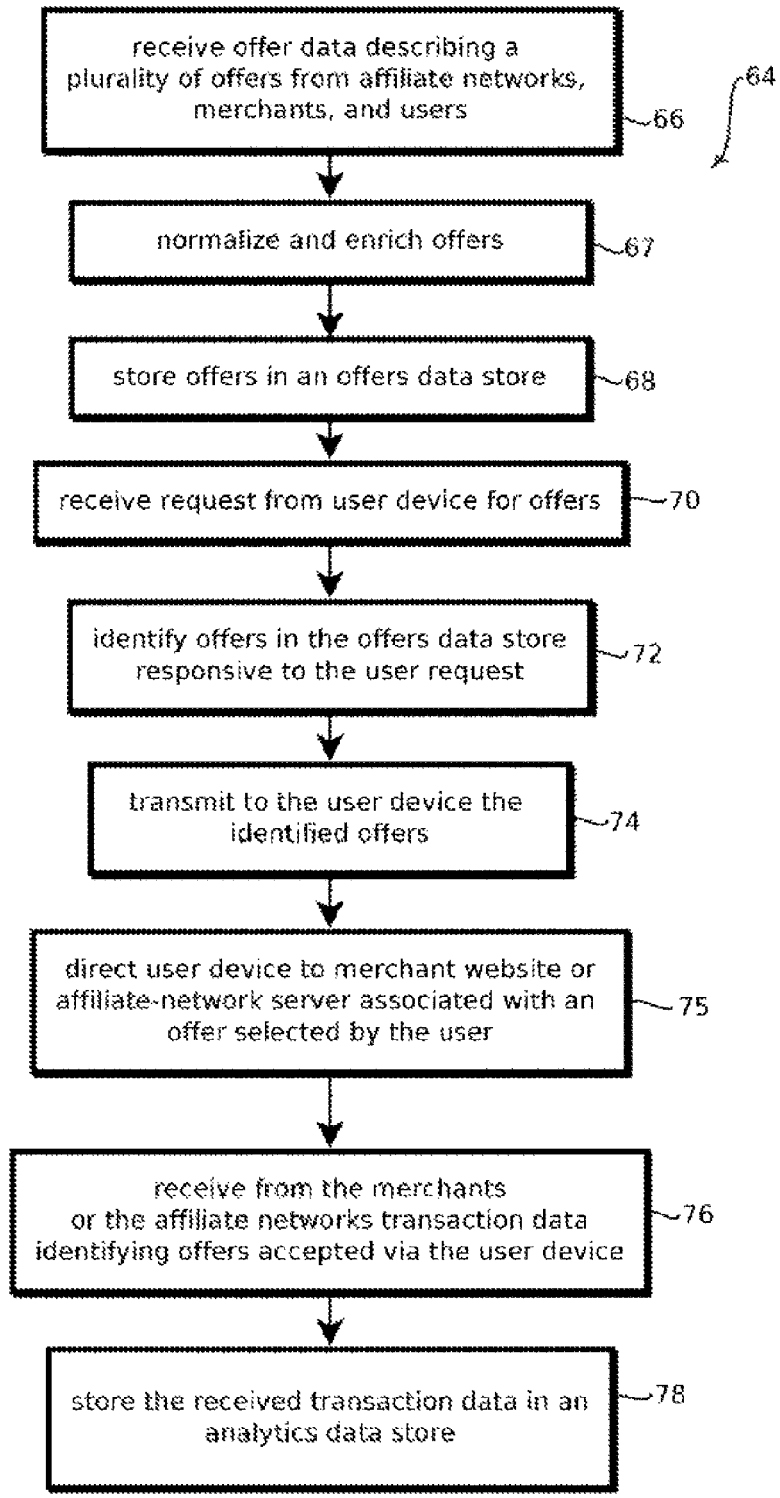
FIG. 2 illustrates an example of a process by which a content engine in the content-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned controller 14 (FIG. 1) by constructing a query to the offer data store 60 based on a request received from the web server 18 or the API server 16. The query may be transmitted to the offer data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 66 through 68, for example, 50 times within a given time, while performing steps 70 through 74 500 times within that given time, and performing the remaining steps of process 64 a single time.

Figure 3:
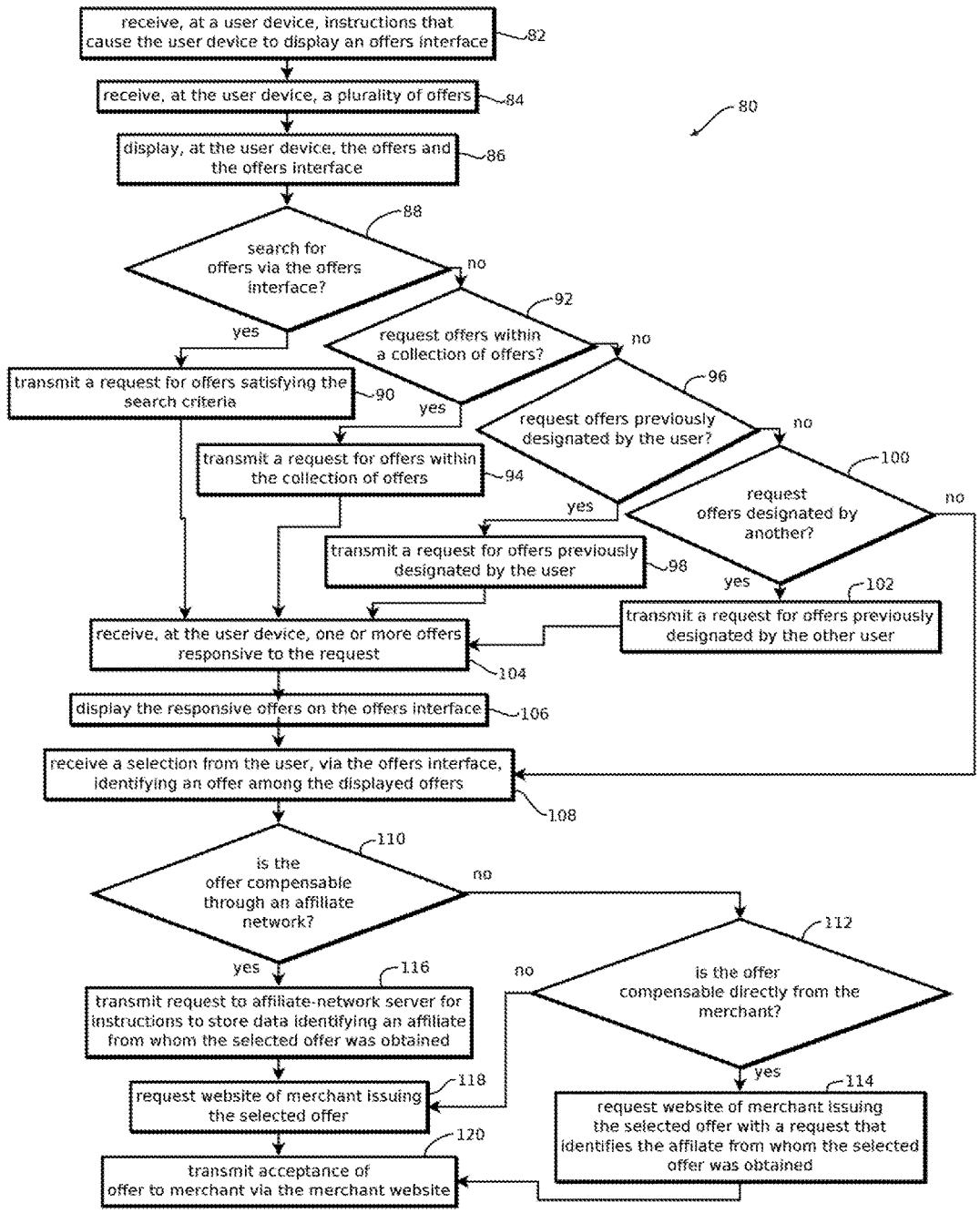
FIG. 3 illustrates an example of a process by which a user device in the content-discovery system of FIG. 1, in some embodiments, obtains and presents to users data related to offers.

In some embodiments, a user device undergoing the process of FIG. 3 may indicate to a content engine that the user has selected an offer (e.g., by clicking on or touching a selectable element in an offers interface associated with the offer). In response, the content engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the content engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the content engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the content engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the content engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the content engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites." or "view my wallet." Upon determining that the user made such a request, the process 80 includes transmitting a request for the offers previously designated by the user, as indicated by block 88. The transmission may be made to the content engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the content engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the content engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the content engine, such as instructions from the content engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the content engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the content engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the content engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale.

Upon transmitting the request to the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the content engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the content engine 12 can be compensated, thereby potentially increasing revenue.

In some embodiments, the content engine 12 may provide offers to a user in response to a user's traversal of a geofence as described, for example, in U.S. patent application Ser. No. 13/928,833 entitled "Determining Offers for a Geofenced Geographic Area," a copy of which is herein incorporated by reference. As used herein, the term "geofence" refers to a virtual perimeter for a real-world geographic area. As described further below, when a user crosses a geofence, offers relevant to a location or activity within the geographic area of the geofenced perimeter are provided to the user via a user device. The geographic area may include, for example, an indoor shopping mall, an outdoor shopping mall, a shopping district, an airport, or any other suitable geographic area having merchant facilities. As described below, in some embodiments the geographic area may include an event venue such as a stadium, arena, hall, theater, convention center, hotel, or other suitable venue.

The content engine 12 may store defined geofences (e.g., polygons, center points and radii, etc.) for providing to user devices. Each geofence may be assigned a unique geofence identifier. Additionally, the content engine 12 may store additional data associated with a geofence. In some embodiments, the additional data may include a list of merchants associated with the geofence. For example, if the geofence corresponds to real-world shopping mall, the list of merchants associated with the geofence may correspond to some or all of the stores in the shopping mall. In some embodiments, the obtained geofences and geofence identifiers may be stored (e.g., cached) on the user device. In some embodiments, only the geofence, geofence identifiers may be stored on the user device, such that the additional data associated with a geofence is not stored on the user device, thus minimizing memory usage of the cached geofences.

Figure 4:
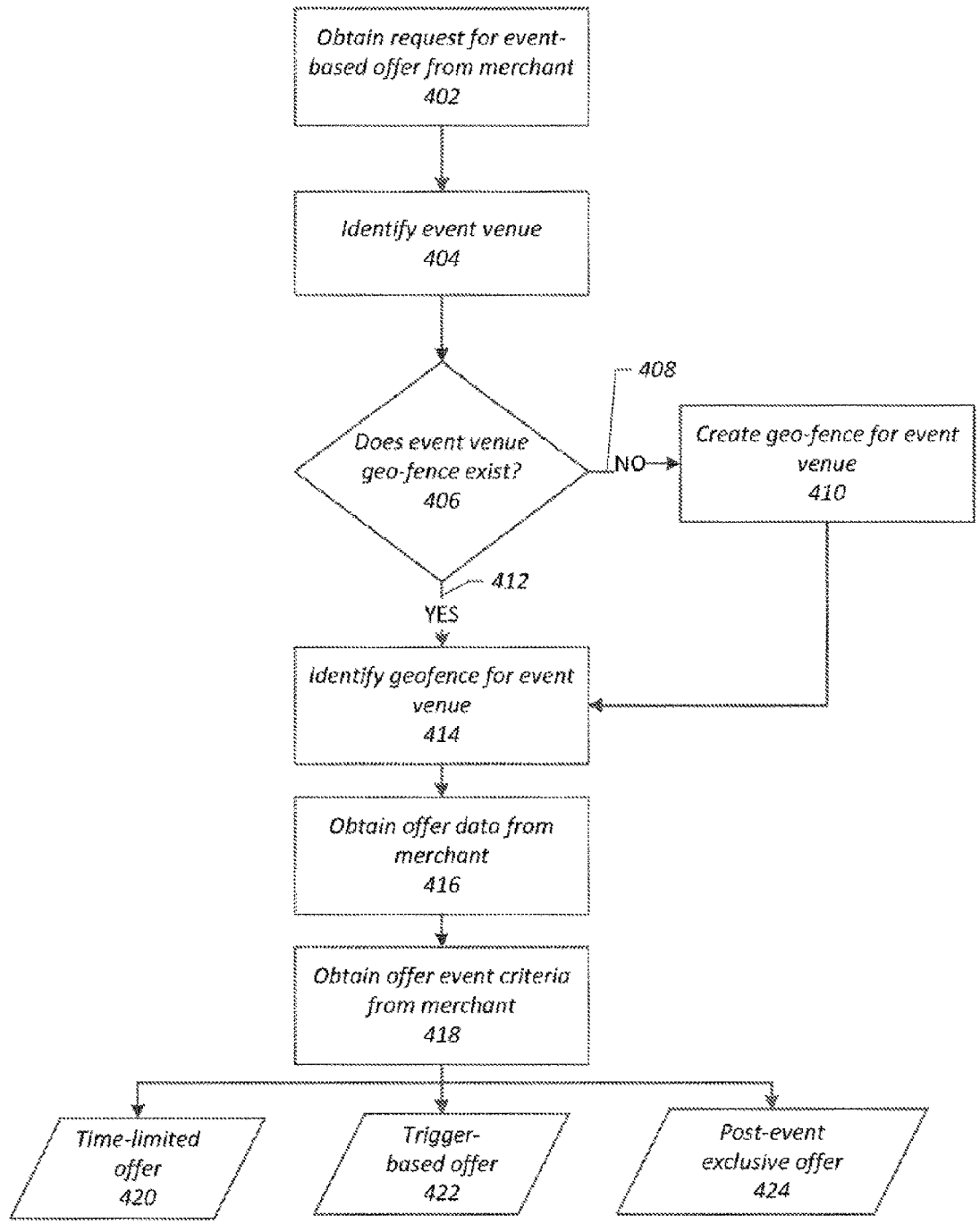
FIG. 4 is a block diagram of a process for creating an event-based offer in accordance with some embodiments.

FIG. 4 depicts a process 400 for creating an event-based offer in accordance with an embodiment of the present invention. Some or all steps of the process 400 may be implemented as executable computer code stored on a non-transitory tangible computer-readable storage medium and executed by one or more processors of a special-purpose machine, e.g., a computer programmed to execute the code. For example, in some embodiments the process 400 may be implemented via the content-discovery system 10. In other embodiments, the process 400 may be implemented using other types of systems, such as a system implemented by both publishers and affiliates, as further described in U.S. Provisional Patent Application 61/882,130 entitled "Tracking Offers Across Multiple Channels," a copy of which is herein incorporated by reference.

Initially, a request for an event-based offer may be obtained from a merchant (block 402). In some embodiments, a user interface may be provided by the content engine 12 so that a merchant may submit requests for offers and offer details. In such embodiments, a user interface may enable a merchant to identify an event venue for an event-based offer, identify an event occurring at an event venue, and define event criteria as described below. Next, the event venue for the event is identified (block 404). The event venue may include any venue suitable for the types of events described herein. For example, the event venue may include a stadium, arena, hall, theater, convention center, hotel, park, track, or other suitable venue. In some embodiments, events may include concerts, sporting events, conferences, tradeshows, lectures, festivals, and other suitable events.

Next, previously defined geofences may be evaluated to determine if a geofence exists for the event venue (block 406). As used herein, the term "geofence" refers to a virtual perimeter for a real-world geographic area. In some embodiments, the content-discovery system 10 may include a database or other data repository of previously defined geofences and corresponding real-world location data. For example, possible event venues may each be identified via an identifier (e.g., geographic coordinates), and geofences may be defined for each possible event venue.

If an event venue geofence does not exist (line 408), a geofence for the event venue is created (410). As noted above, the geofence may be created by defining a virtual perimeter around an event venue. In some embodiments, the geofence may encompass areas outside of the event venue itself that are likely to host users, such as a parking lot, a nearby location with multiple restaurants, bars, or hotels, a shopping mall, a university, or other areas. If the event venue geofence exists (line 412), the geofence for the event venue is identified (block 414). For example, a geofence may be associated with a geofence identifier that is used by the content-discovery system 10 to identify a particular geofence. It should be appreciated that in some embodiments a geofence may be temporarily created for a specific event, such as a festival or other event occurring in a public park or other event venue. In some embodiments, more than one geofence may be created for an event venue. For example, a separate geofence may be created for separated entrances or exits of an event venue.

Next, the offer data may be obtained from the merchant (block 416). Such offer data may include an offer title; a start date of the offer indicating the date or time upon which the offer becomes valid for redemption; an expiration date indicating the date or time upon which the offer ceases to be valid and can no longer be redeemed, an offer description, an offer type, and so on. In some embodiments, the offer data may include a plurality of single-use offer codes, such that each code provides for a single unique redemption of the offer. Additionally, offer event criteria may be obtained from the merchant (block 418). The offer event criteria may determine what criteria should be met to provide an offer to users. For example, in some embodiments offer event criteria may include, for example, a time limit, a trigger based on event data, or event attendance. It should be appreciated that other embodiments may include additional event criteria used to determine when an offer is to be provided to users. In some embodiments the event criteria may include the start of an event, the end of an event, the duration of an event, the outcome of an event (e.g., whether a team wins), statistics of an event (e.g., number of points scored by a team), and attendance at an event. In some embodiments, event-based offers generated using the event criteria described above, may include a time-limited offer 420, a trigger-based offer 422, and a post-event exclusive offer 424, or any combination thereof. Moreover, as noted above, in some embodiments, the event-based offers may be single-use offers limited to a single redemption per use of the offer. In some embodiments, event-based offers may include a sweepstakes offer that enables a user to enter a sweepstakes (or other contest) for a chance to win a prize, either during an event or after an event.

Figure 5:
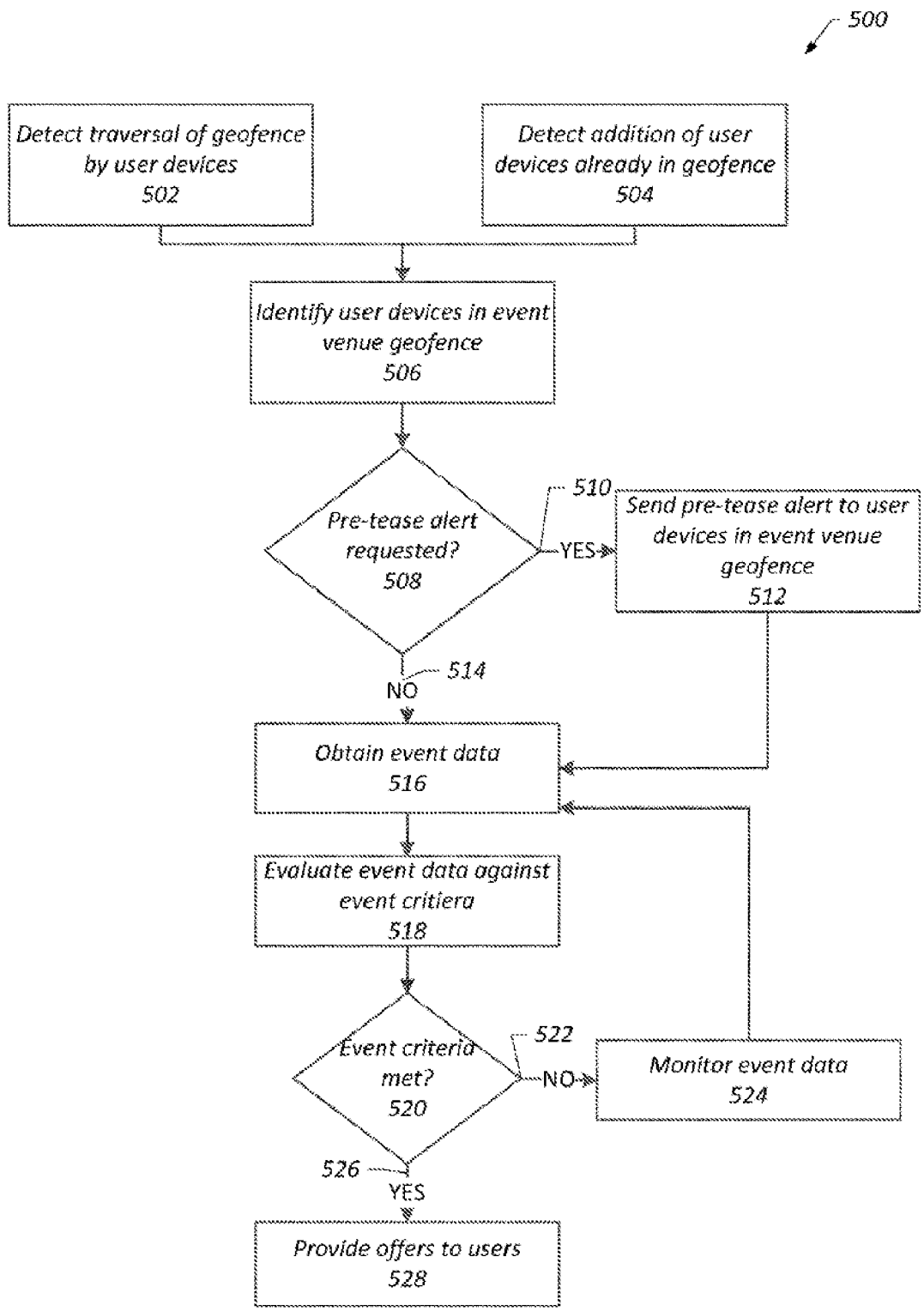
FIG. 5 is a block diagram of a process for providing event-based offers to users in accordance with some embodiments.

FIG. 5 depicts a process 500 for providing event-based offers to users in accordance with an embodiment of the present invention. Some or all steps of the process 500 may be implemented as executable computer code stored on a non-transitory tangible computer-readable storage medium and executed by one or more processors of a special-purpose machine, e.g., a computer programmed to execute the code. For example, in some embodiments steps of the process 500 may be executed by the components of the content-discovery system 10. Moreover, in some embodiments, steps of the process 500 may be distributed among, for example, entities of the content-discovery system 10 or other systems.

Initially, the traversal of an event geofence by user devices may be detected (block 502). In some embodiments, a mobile user device may store local geofences and detect when the mobile user device enters a geofenced area. For example, a mobile user device may obtain location data via communication with a satellite-based positioning system (e.g., GPS) or other suitable locating techniques, such as Wi-Fi based locating, IP address geolocation, or other techniques. Local geofences may be obtained, such as from a content engine 12, and stored on the mobile user device. After a user carrying a mobile user device crosses a geofence, a mobile user device may detect traversal of the geofence and transmit a geofence identifier to the content engine 12. In some embodiments, the mobile user device may include a program (e.g., a native service or application) that monitors the location of the mobile user device and determines traversal of a geofence. In some embodiments, a program of the mobile user device may monitor the geofences stored (e.g., cached) on the mobile user device and detect traversal of a stored geofence.

Additionally, in some embodiments, the addition of user devices already located in the event geofence may be detected (block 504). In some embodiments, a mobile user in an event geofence may install a program (e.g., a native service or application) that enables identification of geofences and notification that the mobile user device is located in a geofence. For example, after a mobile user device traverses an event geofence, the mobile user may subsequently install such a program that identifies the event geofence and transmits a notification to an offers platform to indicate that the device is located within the geofence or otherwise at the event venue. In this manner, mobile user devices within the event geofence may be identified (block 506).

In some embodiments, as mentioned above, an affiliate who will provide offers to users or a merchant may desire to send a pre-tease alert (decision block 508). In some embodiments, a merchant may request a pre-tease alert when sending a request for an event-based offer and offer details, such as through a user interface. The pre-tease alert may include a notification to users of an upcoming event-based offer. In some embodiments, a pre-tease alert may include a prompt to users to tell their friends about an upcoming event-based offer and, in some embodiments, instructions describing how to install a program so that other mobile user devices may receive an event-based offer. In some embodiments, a pre-tease alert request may include identification of when the pre-tease alert is to be provided. For example, in some embodiments pre-tease alert criteria similar to the event criteria discussed above may be defined and used to determine when a pre-tease alert is provided. In some embodiments, the pre-tease alert may be sent after a period of time after the start of an event, e.g., 5 minutes, 10 minutes, 15 minutes, 20 minutes, or greater after the start of an event. If a pre-tease alert is requested (line 510), the alert is sent (e.g., "pushed") to the mobile user devices in the event venue geofence (block 512). If a pre-tease alert is not requested, no alert is sent (line 514).

Next, event data may be obtained (block 516). Event data may include data about an event occurring at an event venue. For example, in some embodiments event data may include whether an event has started, the start time of an event, the end time of an event, the duration of an event, a specific interval or time of an event (e.g., half-time, intermission, overtime, encore), the outcome of an event (e.g., whether a team wins), statistics of an event (e.g., number of points scored by a team), an occurrence during an event (e.g., a touchdown, a three-pointer, a popular song is played, a band plays encore) or other event data. In some embodiments, event data may be obtained from a service or entity that provides event data. For example, statistics of a sporting event may be obtained from a sports news service or entity that makes such information available.

The event data is evaluated against the event criteria (block 518) to determine if the event criteria are met (decision block 520). For example, if the event criteria are a home team of a sporting event venue winning a game, the outcome of the sporting event may be evaluated against these criteria. If the home team won the sporting event, the event criteria are met. In another example, the event criteria may include a specific time period after the start of an event. In such instances, if the event data includes a duration of the event, the event criteria may be met after the duration meets or exceeds the specific time period. If the event criteria are not met (line 522), the event data may continue to be monitored (block 524). If the event criteria are met (line 526), then the event-based offer is provided (e.g., "pushed") to user devices (block 528) for viewing and redemption by users attending the event. For example, in some embodiments offer content is sent to the mobile user devices over a network, and the mobile user devices may receive the offer content and display the offer content for viewing by users. In some embodiments, event-based offers (and pre-tease alerts or other notifications) may be provided to mobile user devices in waves, such that a first group of mobile user devices receives the event-based offer at a first time, a second group of mobile user devices receives the event-based offer at a second time (e.g., some time period after the first time), a third group of mobile user devices receives the event-based offer at a third time (e.g., some time period after the second time), and so on. In some embodiments, mobile user devices may be grouped using geofences (or other location indicators) within an event geofence, and event-based offers (and pre-tease alerts or other notifications) may be provided sequentially to groups of mobile user device based on the group locations.

As described above, in some embodiments offers may be redeemed off-line (e.g., a point-of-sale system at a merchant), on-line (e.g., on a merchant's website), or both. For example, in some embodiments an event-based offer may be redeemed at a concessionaire at an event venue by showing an offer code to the concessionaire. In some embodiments, a follow-up notification may be sent to the user devices after the event ends. For example, in such embodiments a follow-up notification may be sent to mobile user devices indicating that an event-based offer will expire soon and providing redemption instructions or additional offer content to the users.

Figure 6A:
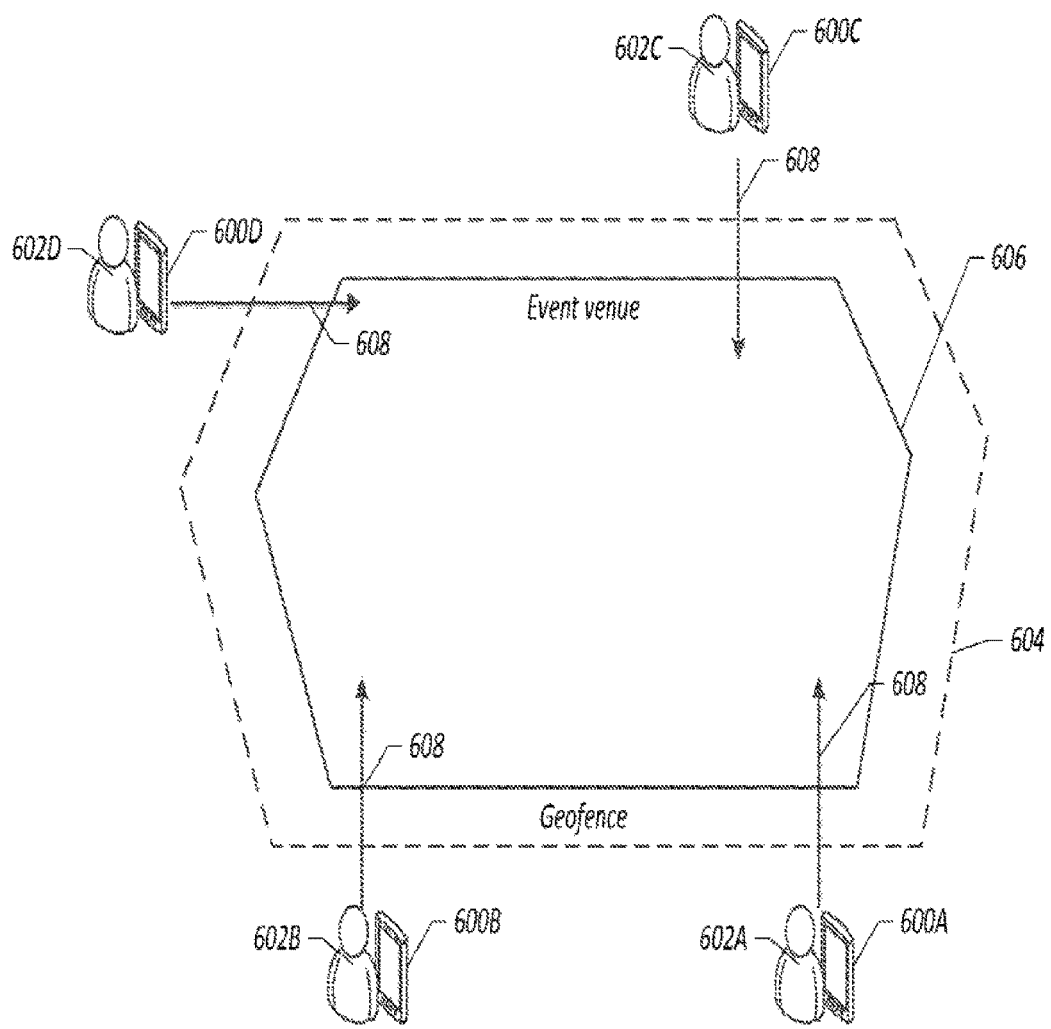
FIGS. 6A-6D are schematic diagrams showing mobile user devices interacting with an event geofence and receiving an event-based offer in accordance with some embodiments.
Figure 6B:
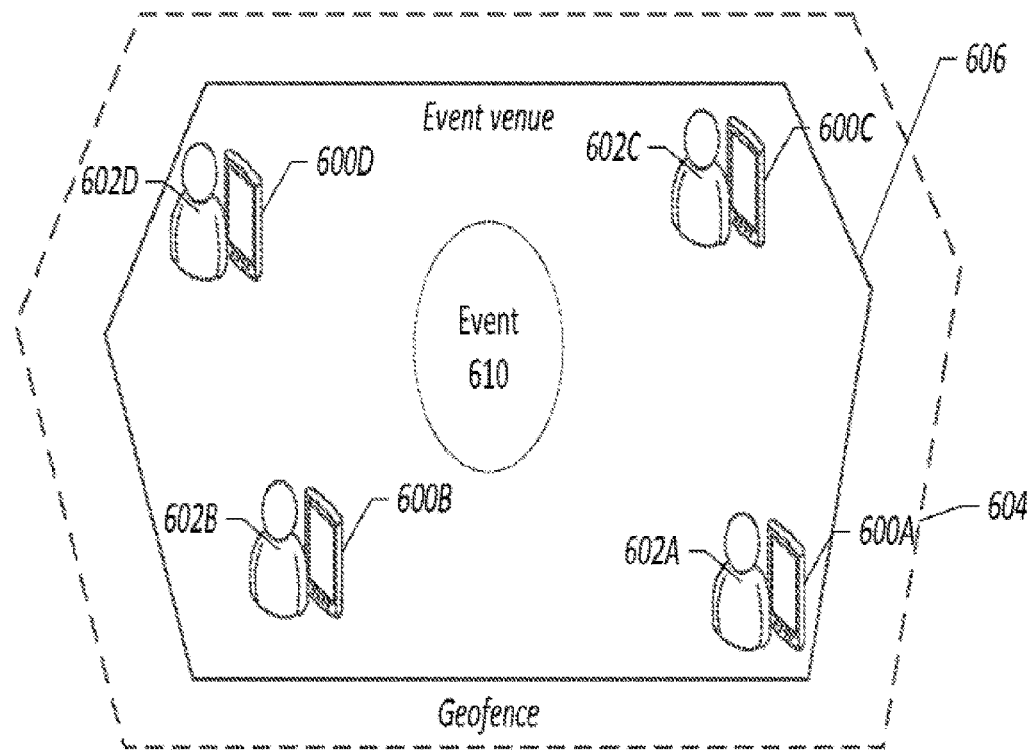
Figure 6C:
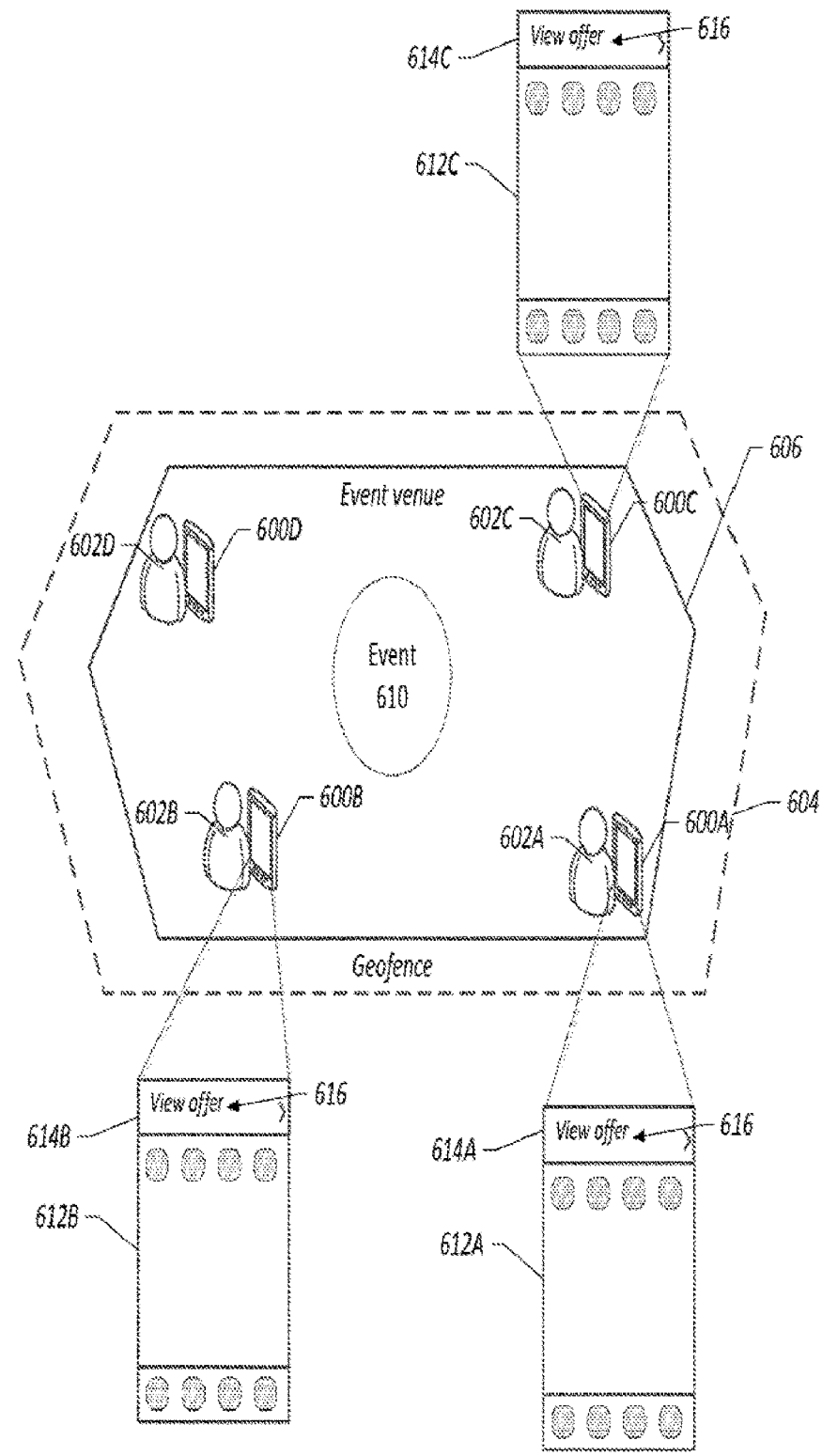

FIGS. 6A-6C depict mobile user devices 600 of users 602 interacting with a geofence 604 that encloses an event venue 606 in accordance with an embodiment of the present invention. The users 602 may be, for example, attendees attending an event occurring at the event venue 606, such as attendees of a concert, a sporting event, a conference, a tradeshow, and the like. In some embodiments, the mobile user devices 600 may obtain geofences within a specific proximity of a location and store (e.g., cache) obtained local geofence data. For example, each mobile user device 600 may store an identifier for the geofence 604 and, in some embodiments, other data describing the geofence 604. Next, as shown in FIGS. 6A and 6B, the user 602 and mobile user devices 600 may traverse the geofence 604 (as indicated by movement arrows 608). As noted above, the traversal of the geofence 604 may be detected by the mobile user devices 600. The mobile user devices 600 may be identified as mobile user devices located within the geofence 604 and, consequently, attending the event occurring at the event venue 606.

As shown in FIG. 6B, the mobile user devices 600 may be located within the geofence 604 and at the event venue 606. As also shown in FIG. 6B, an event 610 may begin at the event venue 606. Each mobile user device 600 may thus be available for event-based offers related to the event 610 and created and provided according to the techniques described herein. It should be appreciated that not all mobile user devices may have the capability to identify traversal of the geofence 604. For example, mobile user device 600D may not include a program that detects traversal of the geofence 604 and identifies the mobile user device 600D as available for event-based offers.

FIG. 6C depicts screens 612 of mobile user devices 600A, 600B, and 600C, such as, for example, a home screen of a user interface. As will be appreciated, the screens 612 and other screens described below may be presented in a user interface of the mobile user device that may receive inputs from a user and provide outputs on a display. In some embodiments, the user interface may include a touchscreen, software modules, or any combination thereof. In such embodiments, inputs may be received as touches on the touchscreen, such as from a digit of a user, a stylus, etc. The screens 612 may include various user interface elements to display information to a user, and in some instances, receive user input. The screens 612 depict notification areas 614 that display notifications such as received text messages, received emails, application notifications, and so on. As will be appreciated, however, the notifications described herein may be displayed in other screens of the user interface, in other areas or components of the user interface (e.g., a pop-up notification) and may be displayed independent of any particular screen or application executed by the mobile user device 600. The notification areas 614 may each display other information, such as status icons (e.g., battery life, network signal strength), date, time, and so on. As will be appreciated, the screens 612 also depicts user-selectable icons 616 that initiate execution of various programs (e.g., application) of the mobile user devices 600.

As shown in FIG. 6C and as mentioned above, a notification 616 for event-based offers may be provided to mobile user devices 600 based on event criteria related to the event 610. As shown in FIG. 6C, each mobile user device 600A, 600B, and 600C may receive and display a notification 616 for an event-based offer. As mentioned above, in some instances mobile user devices such as mobile user device 600D without the capability of receiving event-based offers may not receive and display the notification 616. The notification 616 may include instructions to view an event-based offer and may include offer details (such as the merchant associated with the offer, discount associated with the offer, and so on). A user may thus view the event based offer indicated by the notification 616 by selecting the notification 616 in the notification area 614. Although not shown in FIG. 6C, the mobile user devices 600A, 600B, and 600C may also receive and display a notification 616 for an event-based offer upon or after traversing outside of the geofence 604.

Figure 6D:
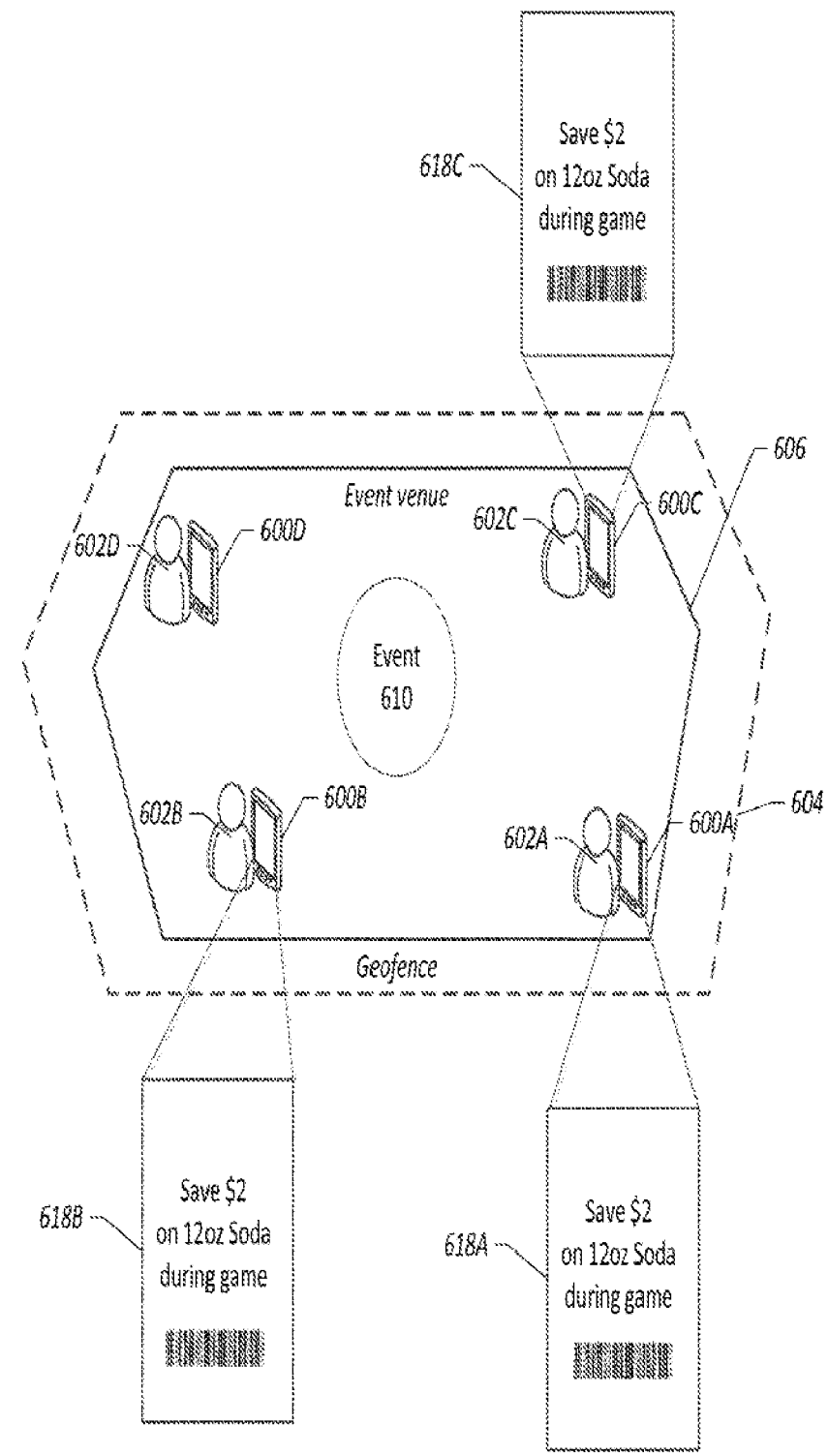

As shown in FIG. 6D, after selection of the notification 616, each mobile user device 600A, 600B, and 600C may display a screen 618 showing the event-based offer 620 received from an offers platform. The event-based offer 618 may include offer content, such as redemption instructions and an offer code to enable redemption. In some embodiments, the event-based offer 618 may be redeemable at the event venue 606, such as at a concessionaire or other merchant at the event venue 606. In some embodiments, as described below, the event-based offer 618 may be redeemable after the event 610, such as at a merchant located at a different location than the event venue 606.

As noted above, mobile-user device 600D may not have the capability of receiving the event-based offer and may not enable the user 602D to view the offer. However, as explained above, in some embodiments the mobile user device 600D may download, install, and use a program after entering the event venue 606 so that the mobile user device 600D is subsequently able to receive event-based offers. As also shown in FIG. 6D, an event 610 may begin at the event venue 606. For example, the event may include a concert, a sporting event, a lecture, or other event and, as described above, event data about the event 610 may be used in the distribution of event-based offers.

Figure 7A:
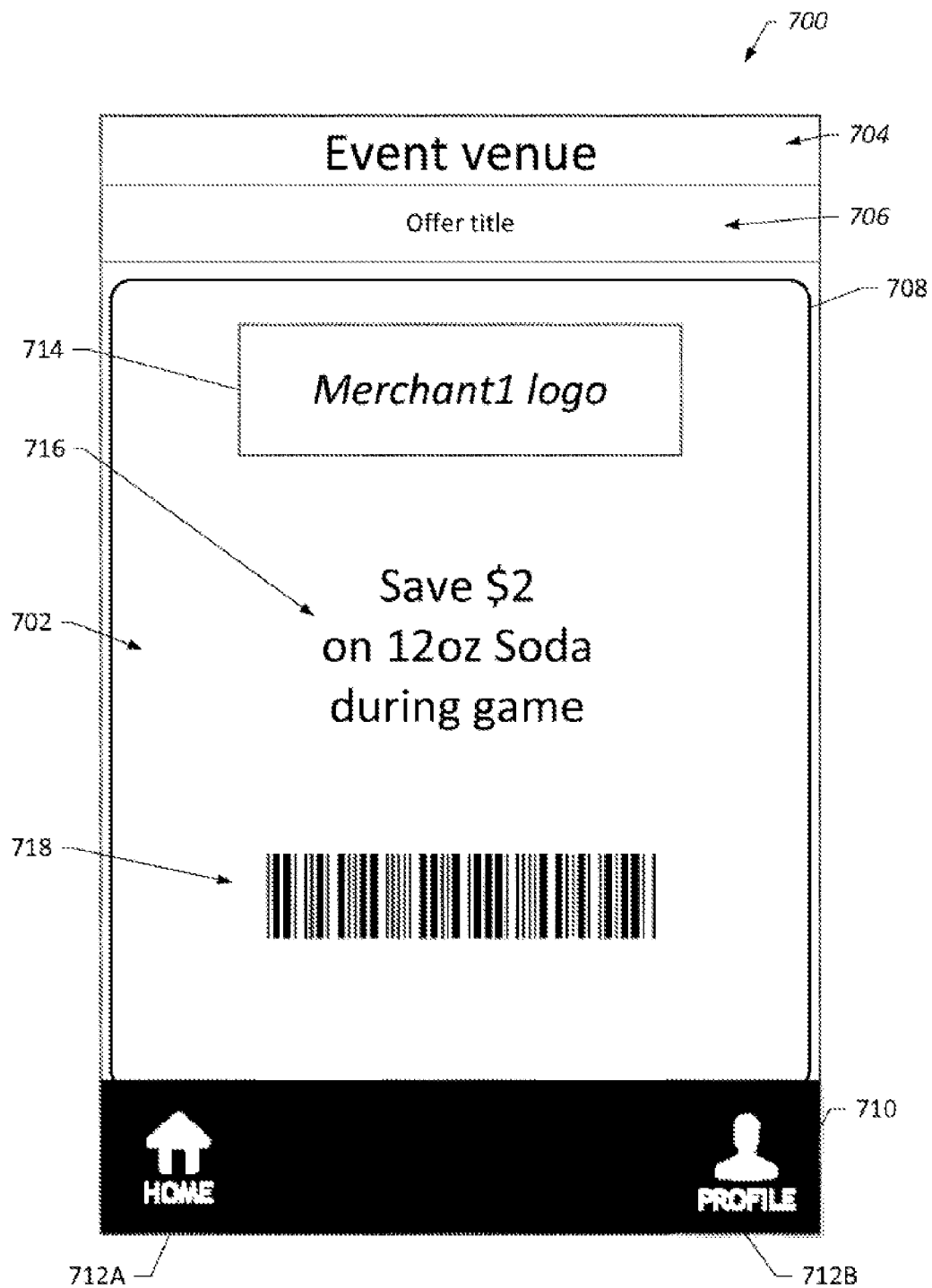
FIGS. 7A-7C are schematic diagrams depicting examples of event-based offers in accordance with some embodiments.
Figure 7B:
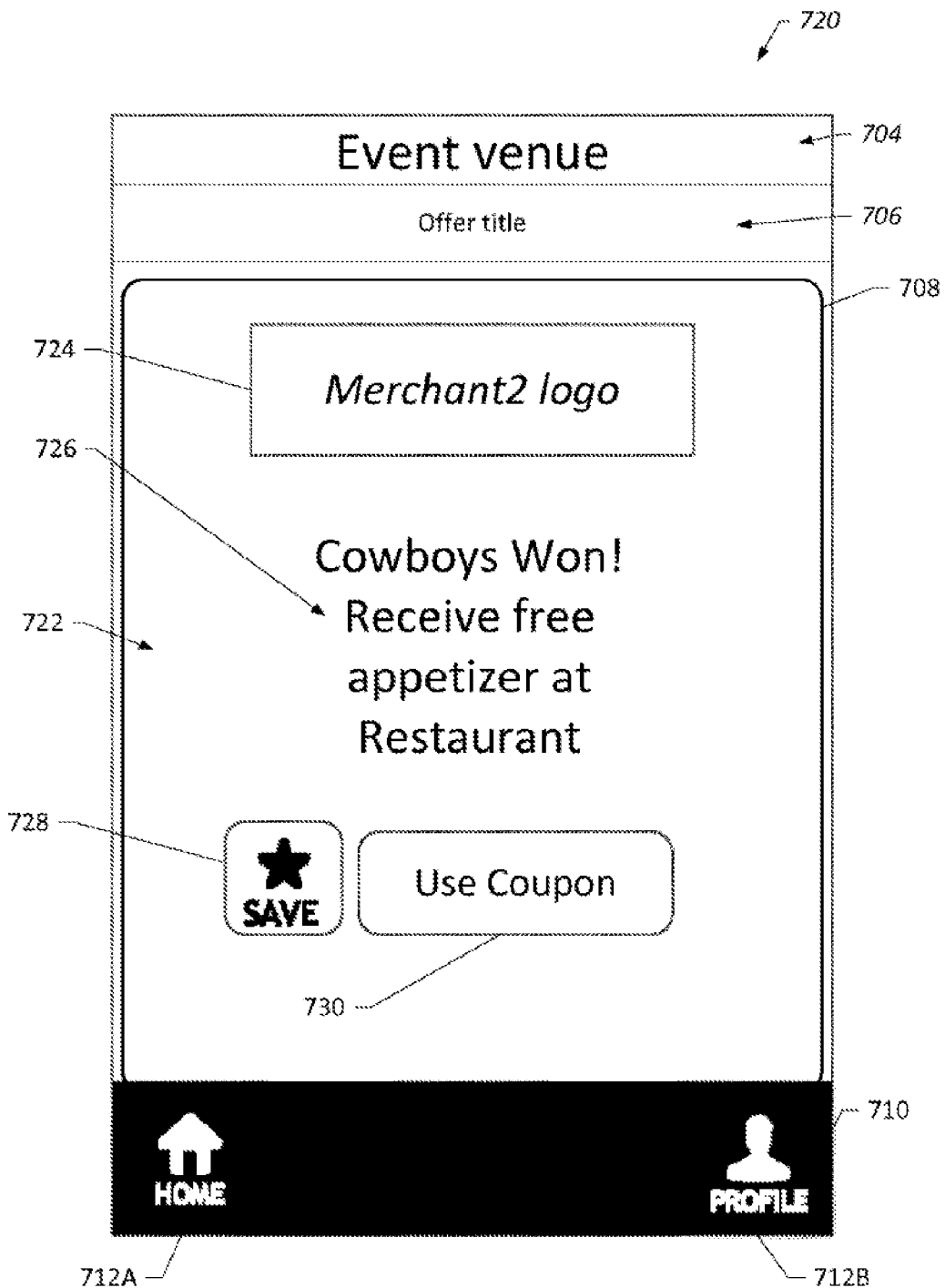
Figure 7C:
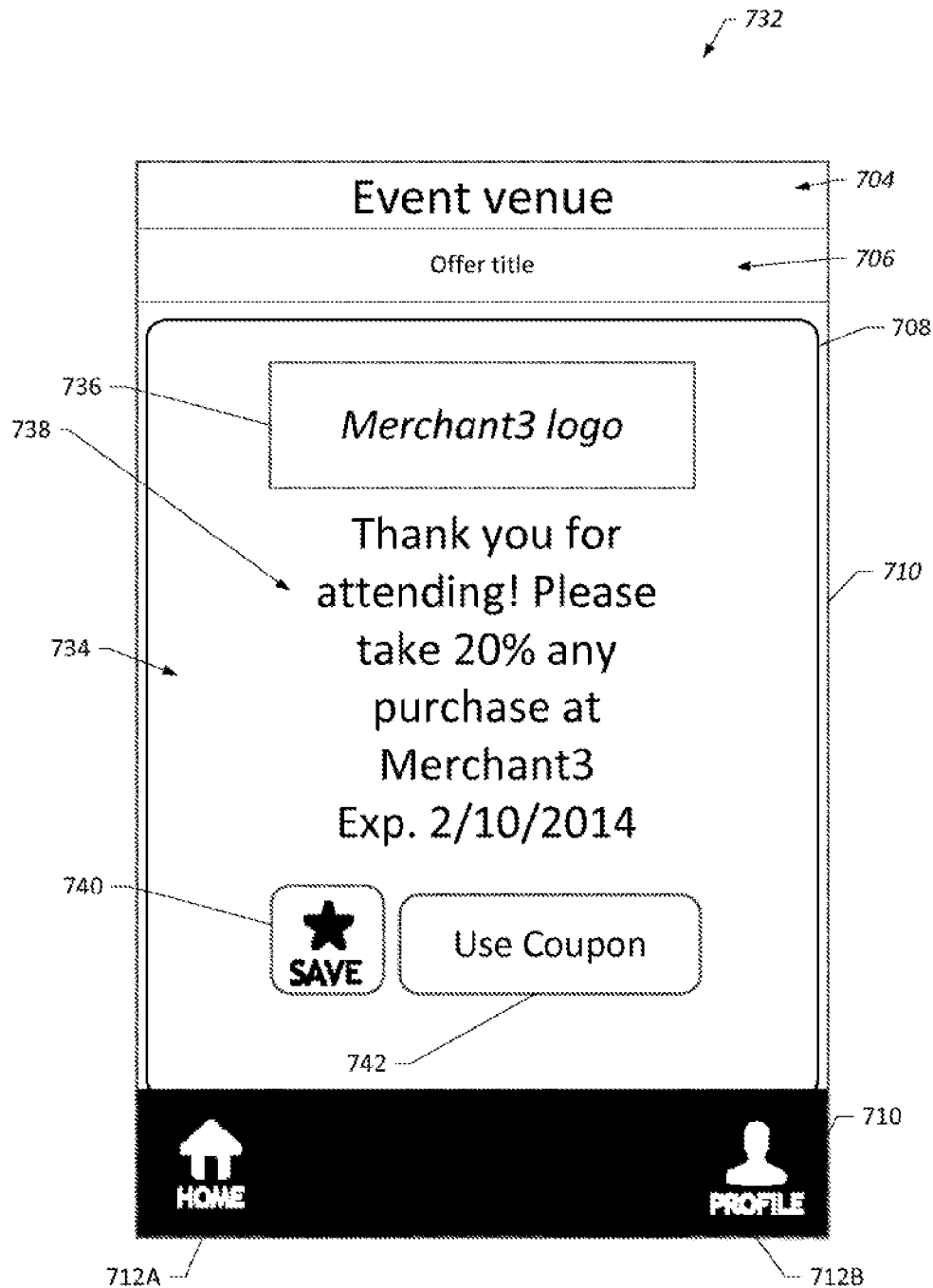

FIGS. 7A-7C depict examples of event-based offers in accordance with embodiments of the present invention. FIG. 7A depicts a screen 700 of a mobile user device illustrating a time-limited event-based offer 702 in accordance with an embodiment of the invention. For example, the screen 700 may be displayed after a user selects the offers notification described above. In some embodiments, the screen 700 may be a screen of a native application (e.g., native application 52) of a mobile user device.

The screen 700 may include various user interface elements to display information to a user, and in some instances, receive user input. For example, the screen 700 may include a header portion 704 an offer title 706, an offer display area 708, and a navigation bar 710. As shown in FIG. 7B, the header portion 704 may be located at the top portion of the screen 700 (e.g., above the title 706 and the offer display area 708). Similarly, in some embodiments the navigation bar 710 may be displayed below the offer display area 708. In other embodiments, the information in the header portion 704 may be displayed in other areas, such as a footer portion, and the navigation bar 710 may be located in other areas of the application, such as a header portion. The offers display area 708 may present the event-based offer 702 for viewing and selection by a user.

The header portion 704 may display a text indicating the contents of the screen 700 presented to the user. For example, the header portion 704 includes the text "Event venue" to indicate to a user that an offer related to an event venue is currently being presented. The offer title 706 may include a title ("Offer title") of an offer displayed in the offer display area 708. The navigation bar 710 may include navigation controls, e.g., buttons 712, such as a "Home" button 712A and a "Profile" button 712B. For example, by selecting the "Home" button 712A, a user may return to a home screen of a native application. Similarly, the selection of the "Profile" button 712B enables a user to access a user profile, such as a user profile associated with the native application.

The event-based offer 702 may be presented with information describing the offer 702 and, in some embodiments, redemption instructions. For example, in some embodiments the event-based offer 702 may include an offer graphic 714, offer text 716, and an offer code 718. The offer graphic 714 may include a text, image (e.g., a merchant logo, a publisher logo, etc.), or combination thereof identifying an entity associated with the offer. The offer text 716 may include information about the offer, such as the goods, services, or both associated with the offer, the discount or other offer provided by the coupon, the expiration date, or any other suitable information or combination thereof. In some embodiments, the offer 702 includes an offer code 718, such as a bar code. In some embodiments, the offer code 718 may enable the user to redeem the offer, such as via a point of sale device.

FIG. 7B depicts another screen 720 of a mobile user device illustrating another event-based offer, e.g., trigger-based offer 722, in accordance with an embodiment of the invention. As described above, the trigger-based offer 722 may be provided when event criteria are met. For example, the trigger-based offer 722 may be provided after the result of a sporting event, such as when a home team of the event venue wins a game.

The trigger-based offer 722 may also be presented with information describing the offer 722 and, in some embodiments, redemption instructions. The trigger-based offer 722 may include an offer graphic 724, offer text 726, a save button 728, and a "Use Coupon" button 730. As noted above, the offer graphic 724 may include a text, image (e.g., a merchant logo ("Merchant2 Logo"), a publisher logo, etc.), or combination thereof identifying an entity associated with the offer. The offer text 726 may include information about the offer, such as the goods, services, or both associated with the offer, the discount or other offer provided by the coupon, the expiration date, or any other suitable information or combination thereof. For example, the offer-based text 726 for the trigger-based offer 722 may include text indicating that certain event criteria were reached and the resulting discount (e.g., "Cowboys Won! Receive free appetizer at Restaurant").

The save button 728 enables a user to save the offer 722 for later use. To use the offer 722, a user may select (e.g., touch) the "Use Coupon" button 728. For example, after selecting the "Use Coupon" button 728, an offer code may be displayed to enable a user to redeem the offer 722, such as at a point-of-sale device or via a merchant's website.

FIG. 7C depicts another screen 732 of a mobile user device illustrating another event-based offer, e.g., a post-event exclusive event-based offer 734, in accordance with an embodiment of the invention. As described above, the post-event exclusive event-based 732 may be provided when event criteria are met, such as when users attend an event. For example, the post-event exclusive event-based offer 734 may be provided during an event but made available for redemption after the event.

Here again, the post-event exclusive event-based offer 734 may be presented with information describing the offer 734 and, in some embodiments, redemption instructions. The trigger-based offer 734 may include an offer graphic 736, offer text 738, a save button 740, and a "Use Coupon" button 742. As mentioned above, the offer graphic 736 may include a text, image (e.g., a merchant logo ("Merchant3 Logo"), a publisher logo, etc.), or combination thereof identifying an entity associated with the offer. As also noted above, the offer text 736 may include information about the offer, such as the goods, services, or both associated with the offer, the discount or other offer provided by the coupon, the expiration date, or any other suitable information or combination thereof. For example, the offer-based text 738 for the trigger-based offer 722 may include text indicating that certain event criteria were reached and the resulting discount and sponsoring merchant (e.g., "Thank you for attending! Please take 20% any purchase at Merchant3"). In some embodiments, the offer-based text 738 may also include an expiration date for the offer (e.g., "Exp. Feb. 10, 2014"). As described above, the save button 740 enables a user to save the offer 734 for later use, and the "Use Coupon" button 742 may cause the display of an offer code to enable a user to redeem the offer 734. For example, as the offer 734 indicates that it may be used at a merchant not located at the event venue, a user may use the save button 740 to save the offer 734 for later use. When present at the merchant, a user may retrieve the saved offer 734 and use the "Use Coupon" button 742 to retrieve an offer code and enable redemption of the offer.

Many traditional user notification mechanisms such as email/push are location driven and us geofences. These types of notifications often suffer because: (1) the location needs to be defined ahead of time; and (2) the location needs to be deemed valuable. Such systems often suffer from both false positives and false negatives, with relatively high costs in accurate notifications.

Some embodiments detection gatherings (e.g., sudden and spontaneous) of users of devices that have geolocation capabilities—such as cell phones. In some cases, once a concentration threshold of significance is detected, those users may then be targeted with location specific content, like a notification. The system may collect user location data in several passive modes and then notify a remote system of the user's movements and significant points of interest. Additionally, the client devices may notify the server of significant change of location events. The server may monitor location historical data along with current location 'significant change events' and aggregate the location data into areas with population density values over time. When a significant threshold of users or change in users is detected, the system may then notify the area dynamically with relevant content.

Some embodiments may collect historical location data passively and aggregate that data on a server to infer points of interest dynamically and determine whether those places have business value ahead of time. Some embodiments may detect of significant change in population density versus background levels to trigger a notification to users in that area. This means, in some cases, that an entity that wishes to contact its users under these situations does not have to map geofences ahead of time and can instead focus on locations their users actually go. Another advantage presented by some embodiments is the time component of knowing when users are or are not interacting with a location and the ability to use this information to determine if a timely response or no-response is needed based on the individual user. That said, not all embodiments necessarily provide all of these benefits or any of these benefits, which is not to suggest that other features may not also be omitted.

Figure 8:
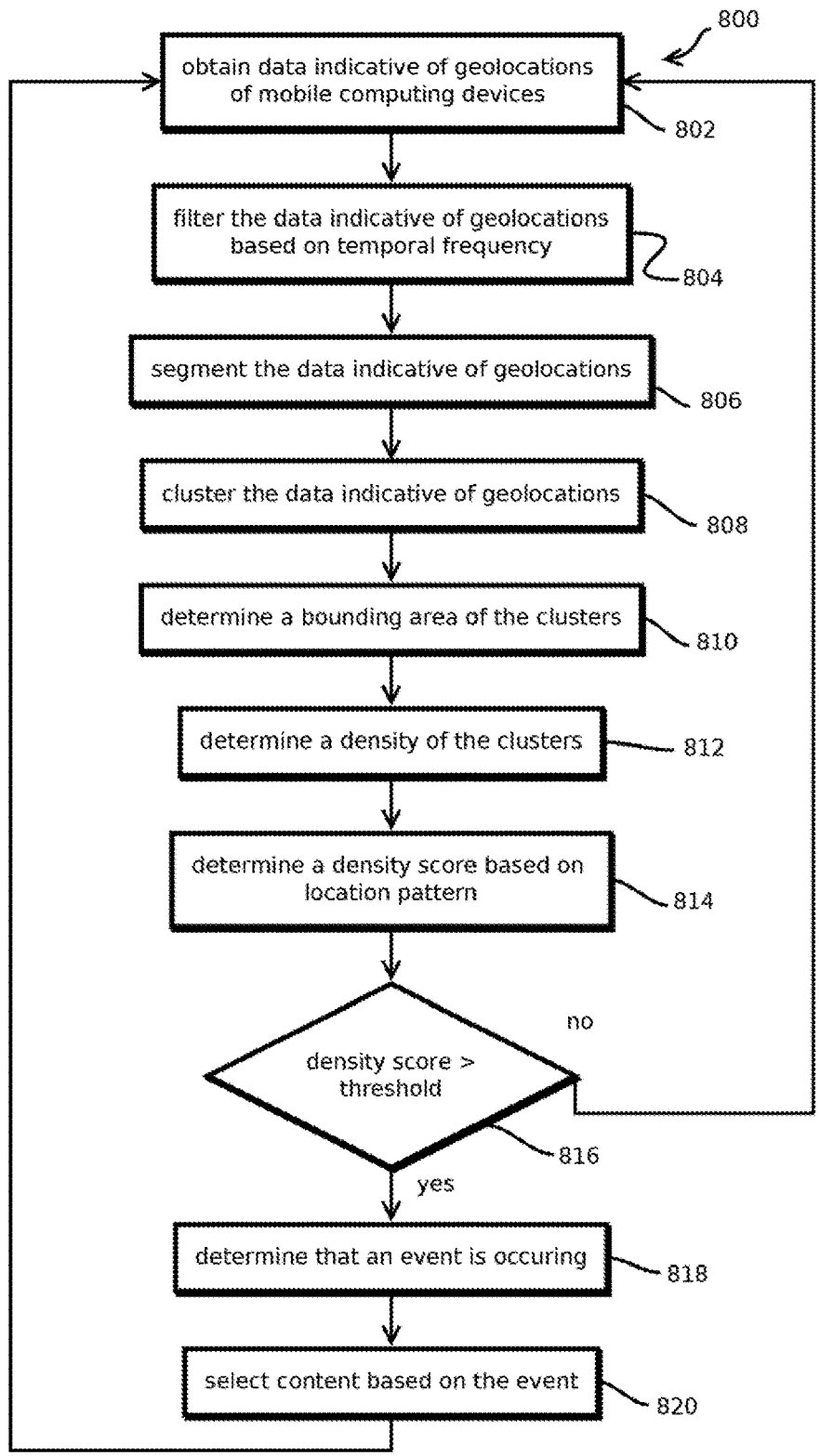
FIG. 8 is an example of a dynamic event detector in accordance with some embodiments.

FIG. 8 is a flow chart illustrating an example of a process 800 that dynamically detects events with crowds as the events are occurring, in some cases even if the location was not previously known as an event hosting location, e.g., with unsupervised machine learning techniques. In some embodiments, the process 800 may be performed by the event targeter 13 shown in FIG. 1 and described in greater detail below with reference to FIG. 9.

In some embodiments, the process 800 may include obtaining data indicative of geolocations of mobile computing devices, as indicated by block 802. In some cases, the data may indicate the location of a relatively large number of mobile computing devices. The resulting volumes of data may present computational challenges that arise at scale with respect to certain subsequent steps, which may be addressed with techniques described below for expediting related operations of computer systems.

In commercially relevant use cases, embodiments are expected to communicate with substantially more than 5,000 mobile computing devices providing geolocation data, e.g., more than 100,000 devices. In some cases, the geolocations may be distributed over a relatively large geographic area, such as an entire country, continent, or the world. In some embodiments, the number of mobile devices concurrently at a single event reporting their geolocations may be relatively large as well, in some cases exceeding 1,000, or more than 10,000.

The data indicative of geolocations may take a variety of different forms. In some embodiments, the data is latitude and longitude coordinates, associated confidence measures for the geolocation (such as an error radius), along with the timestamp indicating when the coordinates were determined by a respective mobile computing device. In some embodiments, the data includes geolocations of each of a plurality of devices measured and reported by each of the respective mobile computing devices, or in some embodiments, the data includes a geolocation of a single computing device and a measure of a number of computing devices detected nearby by that single computing device and that share approximately the same geolocation.

In some embodiments, the coordinates may be obtained from a location sensor, using the techniques described above, on respective mobile computing devices. In some cases, a native application (e.g., application 52 of FIG. 1) executing on each of the mobile computing devices may include, and register with an operating system of the mobile computing device, an event handler that receives events from the operating systems indicating that the mobile computing device has moved more than a threshold amount, e.g., an indication that the mobile computing device has stopped receiving one set of wireless signals and started receiving another, like during a handoff between cell towers or changes in the SSIDs of wireless local area networks. Upon detecting such a change, the operating system may emit an event that is handled by the native mobile application, which may then, in response, request the geolocation coordinates of the mobile device and report those coordinates to the remote event targeter 13. In some cases, the requested geolocation may have greater than a threshold accuracy (e.g., 100 meters) to reduce the battery drain on the mobile computing device and delay associated with more accurate measurements, e.g., by avoiding engaging a GPS sensor and relying instead on less accurate cell tower triangulation and WiFi™ signals. For larger sample sizes associated with crowds, less accurate measurements are expected to be adequate. Further, selectively reporting locations in response to relatively large changes in location is expected to reduce the strain on the battery of mobile devices and reduced bandwidth usage, both of which are often particularly scarce when users are attending crowded events. That said, embodiments are not limited to systems that employ this technique, as multiple independently useful inventions are described.

As noted, in some embodiments, a single mobile computing device may provide data indicative of geolocations of a relatively large number of nearby mobile computing devices. For example, in some embodiments, a native mobile application executing on the given mobile computing device may periodically poll a wireless network interface for a list of identifiers of other mobile computing devices within broadcast range. For example, some embodiments may obtain a list of identifiers embedded in Bluetooth beacons broadcast by other mobile computing devices or MAC (medium access control) addresses broadcast by other mobile computing devices. For example, some mobile computing devices are operative to broadcast the devices unique MAC address along with a probe request to search for nearby Wi-Fi networks, and the given mobile computing device may monitor and take inventory of those MAC addresses. In some cases, each received address may be associated with a timestamp of the time received, and some embodiments may periodically cull a list of such addresses to remove identifiers that are older than a threshold age (e.g., older than one hour, as most events tend to be relatively short). The number of identifiers in the resulting list may indicate the number of mobile computing devices nearby, and this number may be reported by the given mobile computing device to the event targeter 13. In some embodiments, reducing the number of mobile computing devices attempting to communicate with the event targeter 13 is expected to conserve relatively scarce battery power and wireless media bandwidth in crowded areas, though again not all embodiments provide this benefit.

Some embodiments may use other techniques for a single mobile computing device to ascertain whether it is at a geolocation representative of the geolocation of other nearby mobile computing devices, as happens in crowded areas. Some embodiments may sample audio noise from a microphone of the mobile computing device and classify the resulting noise as indicating the presence of a crowd. For example, some embodiments may execute a Fourier analysis on the audio feed to identify features of the audio and, then, classify those features as either indicating the presence of a crowd or not. In some cases, a classifier executing on the mobile computing device may be trained by sampling crowd noise and other commonly heard noises, labeling the corresponding audio feeds as indicating the presence of a crowd or not, and training (e.g., with supervised learning) a neural network classifier, a decision tree classifier, or the like, for instance with a stochastic gradient descent or other process by which parameters are iteratively adjusted in a direction that reduces error between a training set and a prediction until the changes in the amount of error are less than some threshold amount.

In some embodiments, the native mobile applications on each of the mobile computing devices may be configured to periodically cause the mobile computing devices to transmit a wireless beacon with a unique identifier, and a subset of the mobile computing devices may take inventory of the identifiers and report the inventory to the remote event targeter 13, thereby potentially reducing bandwidth and memory usage among the community of devices.

In some embodiments, coordinated activity among the mobile computing devices may indicate the presence of a crowd. For example, the mobile computing devices may execute a native mobile application that forms a network of pulse coupled oscillators among the mobile computing devices. For instance, each mobile computing device may approximately periodically transmit a beacon, and the timing of the beacon may be advanced by some increment forward in response to receiving a beacon from another mobile computing device before some threshold time, e.g., the next transmission. In some cases, when more than a critical mass of mobile computing devices are within broadcast range of one another, it is expected that the mobile computing devices may collectively exhibit different behavior than smaller groups, for instance, by synchronizing relatively tightly and quickly, e.g., within some threshold. In some cases, disturbances may be periodically introduced to the network of pulse coupled oscillators to update measurements. In some cases, representative devices selected using the techniques described above may report to the event targeter 13 data indicative of the behavior of the network of pulse coupled oscillators, along with the geolocation, thereby providing data indicative of geolocations of a group of mobile computing devices.

In some cases, the mobile computing devices responsible for reporting for the group may be determined in an ad hoc fashion to reduce communication among the devices and thereby save bandwidth and power. For instance, mobile computing devices having a unique identifier with a certain sequence of least significant digits (e.g., the value "00") may be designated as devices responsible for reporting the inventory, or to shift the burden among the devices, in some cases, the least significant digits of the current time hashed (e.g., with an MD5 hash algorithm) with a MAC address. In crowds of sufficient size to be of interest, it is expected that at least one device will meet the criteria to act as a reporter for the group.

In some cases, a single mobile device may report its geolocation and a number of sensed mobile computing devices within range, in which case, each reported geolocation may be associated with a mobile device count. In some embodiments, the geolocation may be repeated for each instance of the count in the data set for subsequent operations. In some cases, the identifiers of other devices may also be reported, and the event targeter 13 may de-dupe the results to obtain a relatively accurate count. Or even without de-duping, results are expected to correlate with crowd size.

Next, some embodiments may filter the data indicative of geolocations based on temporal frequency, as indicated by block 804. In some cases, those targeting content are interested in events that have certain properties. For instance, those targeting content may be interested in events that are non-routine for the individuals attending the event, such as a concert, sporting event, festival, or the like, and wish to distinguish more routine events that may also draw crowds, like crowded portions of morning or evening commutes, or crowded lunchtime cafeterias. Or some may wish to exclusively target routine events. To distinguish these crowds and identify events of relevant relevance, some embodiments may filter the geolocations based on past geolocations of mobile computing devices to remove those geolocations that do not indicate the type of event that is relevant.

To identify non-routine (or routine) events, some embodiments may maintain a data repository of previous geolocations reported from mobile computing devices, such as geolocation histories spanning some duration of time in the past, like more than one day, more than one week, and in some cases more than one month, depending on whether weekly or monthly events are considered routine. In some embodiments, each geolocation may be associated with a unique device or account identifier, such as an anonymized value formed by calculating a hash function on aspects of the user's account. Upon receiving data indicative of geolocations, some embodiments may parse identifiers from that data to identify the mobile computing device or user accounts (as may be reported by the native mobile application) and retrieve corresponding historical geolocation records from the data repository. Some embodiments may then determine whether the user is frequently at the geolocation, e.g., whether the user is within some threshold distance of the reported geolocation, with greater than a threshold frequency. In some cases, the geolocation's are reported as identifiers of places the user has visited (e.g., as specified by a bounding polygon), and some embodiments may determine whether the user has visited that place with greater than a threshold frequency. In some embodiments, to further enhance privacy, the filtering and corresponding data repository may be provided on the mobile computing device, rather than by the event targeter 13, and the mobile device may report the data that passes the filter.

It is expected that in commercially relevant use cases the number of reported geolocations will be relatively large, in some cases spanning into the hundreds of thousands or millions of coordinates. Certain described processing steps, when performed with simpler techniques, often do not scale particularly well as data sets reach this size. Among the techniques that may be used to mitigate this issue is segmentation and concurrent analysis of respective segments on multiple computing devices.

Some embodiments may segment the data indicative of geolocations according to place and time. In some embodiments, geographic regions may be divided into grids or zip codes, and each grid square or zip code may indicate a segment, with geolocations within that grid square or zip code being designated for that segment. Similarly, data may be segmented according to time, for instance, by excluding data older than some threshold age from subsequent operations. Like the other steps described herein, in some embodiments, segmenting may be performed in a different sequence from that presented, for example, prior to filtering to facilitate expedited search of historical data.

Next, some embodiments may cluster the data indicative of geolocations, as indicated by block 808. In some embodiments, clustering may be performed exclusively on data within a segment, without at least initially determining whether clusters span segments, in order to expedite computation. Certain clustering algorithms perform pairwise analyses that can slow computations when data sets become excessively large. Appropriately sized segments are expected to mitigate this issue and expedite operations. In some embodiments, various shortcuts may be used to reduce the number of pairwise operations in clustering algorithms, for example, with spatial indexes or pre-sorting the geolocations according to latitude or longitude. After clustering, some embodiments may determine whether clusters in adjacent segments are within a threshold distance (e.g., as measured from respective centers of mass) and then, in response to detecting this pattern, re-cluster the geolocations in both clusters to determine whether the clusters should be consolidated.

A variety of different clustering techniques may be used. Some embodiments may execute a density-based clustering algorithm, like DBSCAN, to establish groups corresponding to the resulting clusters and exclude outliers. To cluster according to geolocation, some embodiments may iterate through each of the geolocations reflected in the records and designate a geolocation as a core geolocation if at least a threshold number of the other geolocations in the records are within a threshold geographic distance. Some embodiments may then iterate through each of the geolocations and create a graph of reachable geolocations, where nodes on the graph are identified in response to non-core corresponding geolocations being within a threshold distance of a core geolocation in the graph, and in response to core geolocations in the graph being reachable by other core geolocations in the graph, where to geolocations are reachable from one another if there is a path from one geolocation to the other geolocation where every link and the path is a core geolocation and is it within a threshold distance of one another. The set of nodes in each resulting graph, in some embodiments, may be designated as a cluster, and points excluded from the graphs may be designated as outliers that do not correspond to clusters. In some cases, first, second, and third threshold distances may be applied with detecting core points, when detecting reachable core points, and when detecting reachable non-core points, and in some cases the first, second, and third threshold distances may be the same distance.

Or some embodiments may use other distribution-based clustering algorithms or density-based clustering algorithms, for example, the OPTICS algorithm, the EnDBSCAN algorithm, a mean-shift clustering algorithm, a Gaussian mixture model formed with an expectation-maximum algorithm, or the BIRCH algorithm. In some embodiments, clusters may be determined based on a density of mobile devices in each of the segments, for example, by determining that more than a threshold number of adjacent segments have more than a threshold number of mobile computing devices, as indicated by the geolocations. In some cases, a clustering algorithm that does not require a number of clusters to be specified in advance may be used.

Next, some embodiments may determine a bounding area of the clusters, as indicated by block 810. Again, a variety of different techniques may be used to determine the bounding area of each of the clusters. In some embodiments, the clustering algorithms may produce clusters corresponding to each of several different events having crowds, and boundaries of the geographic areas including those crowds are expected to be useful for estimating density and determining where to target content.

In some cases, a smallest radius that includes more than a threshold amount of the cluster may be determined as an approximated bounding area. In another example, a convex hull algorithm may determine the bounding area. For instance, the bounding area may be determined with a Jarvis march algorithm, a Graham scan, a Quickhull algorithm, a Divide and conquer algorithm, a Monotone chain algorithm, an Incremental convex hull algorithm, Chan's algorithm, or the like.

In some cases, bounding areas may be determined based on angles between the geolocations. Some embodiments may select a geographic coordinate, such as the southernmost geographic coordinate, and then determine an angle formed by that geographic coordinate and each of the other geographic coordinates. The geographic coordinates may then be sorted according to this angle. Embodiments may then iterate through the sorted sequence to determine whether a line between the two points preceding a given iteration indicate a left turn or a right turn. Upon determining that a left turn has incurred, the line between the points may be designated as indicating a portion of the convex hull.

Or in another example, an embodiment may select the southernmost geographic coordinate among the coordinates, determine the angle between that geographic coordinate and each of the other geolocation coordinates, and select a largest or smallest angle as indicating a portion of the convex hull. Embodiments may then proceed along that angled line to the other geographic coordinate and repeat the process, wrapping around the convex hull, until the first geographic coordinate is encountered. Some embodiments may produce a set of vertices corresponding to latitude and longitude coordinates that encompass the cluster. Or some embodiments may identify as the bounding area the segments having greater than a threshold density and being adjacent.

Next, some embodiments may determine a density of the clusters, as indicated by block 812. In some cases, the density of the clusters may be determined by calculating an area of the bounding area and then dividing that area into a number of mobile computing devices (e.g. geolocation coordinates to produce a value with units in terms of geographic coordinates per unit area) determined to be within the cluster. For polygons defining convex hulls, some embodiments may and iterate through each of the vertices in sequence to form a set of triangles having areas that are integrated to determine the area of the bounding polygon.

Some embodiments may determine a density score based on a location pattern of the geographic area of the cluster, as indicated by block 814. In some cases event venues may repeatedly experience crowds, and subsequent clusters at the same (e.g., overlapping or coterminous) geographic location are expected to be more likely to indicate crowds. Accordingly, some embodiments may up-weight (e.g., multiply by a value greater than 1) densities based on a pattern of crowds being detected at an overlapping geographic area. In some cases, as events are identified, those events may be stored along with definitions of the bounding area in the repository, and the repository may be queried for overlapping previous events when new events are detected. In some cases, the weighting may be based on an amount of events detected over some trailing duration, like a frequency or count. Some embodiments may limit the search for overlapping prior events to the corresponding segment to avoid relatively computationally expensive operations on large numbers of previous polygons.

Next, some embodiments may determine whether the density score is greater than a threshold, as indicated by block 816. Upon determining that the density score does not exceed the threshold, some embodiments may return to step 802 and continue monitoring for events. Alternatively, upon determining that the density score does exceed the threshold, some embodiments may proceed to the next step.

Next, some embodiments may determine that an event is occurring responsive to the determination of block 816, as indicated by block 818. In response, some embodiments may update an event repository with a record of the event, a density score for the event, and a bounding geographic area for the event to use in detecting subsequent patterns and in targeting content.

Upon determining that an event is occurring, some embodiments may select content based on the events, as indicated by block 820. In some cases, content may be selected based on attributes revealed during inferring whether an event is occurring. For example, certain types of content may be determined to be (or labeled as) appropriate to events that are non-routine, are of greater than a threshold size/density, are of less than a threshold size/density, or are routine.

In some cases, profiles of users known to be at the events may be accessed to construct a profile of the event, and content may be selected based on the event profile. For instance, embodiments may determine that users at the event have historically responded to, or engaged with, content pertaining to golf, and content related to golf may be selected in response to send to those users or other users entering the geographic area of the event.

Similarly, events in certain geographic areas or overlapping with particular places may indicate that content should be selected corresponding to those areas or places. For instance, an event in a sports arena may yield the types of content described above. Some embodiments may retrieve attributes of a business from a business listing based on the geographic area and select the content based on the attributes. In some cases, the business listing may include a taxonomy of attributes of businesses, e.g., restaurants, Indian restaurants, fast-casual Indian restaurants, and content may be designated as appropriate for events in places having certain attributes.

In some cases, the attributes of the geographic area may have changed or may simply not be known, particularly as events are detected over relatively large areas that are expensive to monitor and update. In some embodiments, a business listing may be queried to identify a website address of a business having a geographic location corresponding to the bounding area of the cluster, e.g., inside the cluster. In some cases, multiple business listings may occur within the bounding area, and some embodiments may rank the business listings based on proximity to a center of mass of the geolocations within the cluster and select the highest ranking business listing. Or some embodiments may parse a description of the business listing for terms associated with events, like "stadium," "tickets," "parking," and the like, and rank the business listings according to the number of occurrences of such terms to select the highest ranking listing.

In some embodiments, the web site is accessed through a URL of the business listing (or other address, like an IP address), and embodiments may crawl the website to identify information about the event. Some embodiments may recursively request each webpage of the business listing website and determine whether the webpage contains natural language unstructured text indicative of a calendar or event listing. For instance, some embodiments may detect keywords indicating such sources of data, like "calendar" or "event listing." Upon detecting these keywords, some embodiments may iterate through each record in an associated data structure, like a sequence of div boxes at a given hierarchical level of a document object model or a sequence of entries in a table, and detect the presence of text indicating a date, for example, with regular expressions calibrated to detect dates. Upon detecting a date corresponding to the date of the event, some embodiments may parse associated text for keywords descriptive of the event, e.g., in the same div box or in the same row of a table. For example, some embodiments may score the keywords according to a term frequency inverse document frequency algorithm and rank the keywords by score to identify a threshold number of top-ranked keywords of the greatest relevance. Some embodiments may then compare those keywords to keywords previously associated with content, for example, provided by the content providers, or appearing in descriptions of the content, to select content that matches (e.g., contains the same keywords).

Or, some embodiments may exclude content from being sent to events associated with certain keywords. Many content providers do not wish their content to be associated with certain events, for instance, those providing content relevant to children may wish to avoid having their content sent to a beer festival, and those providing content inappropriate for children may wish to avoid having their content sent to an event sponsored by a collection of elementary schools.

Some embodiments may serve different types of content depending upon the density of a group of users detected in a geographic area. For example, density associated with sporting events or large concerts may receive one type of content, well density is associated with smaller groups may receive a different content. Some embodiments may select content according to whether an environmental conditions in the geographic area, for instance, serving offers for umbrellas in response to detecting that rain is imminent. In some cases, detected geolocations, such as geofences, may be associated with durations of time in which the geolocation is deemed relevant, for example, in cases in which geofences are periodically relevant, like football stadiums during Saturday's in the fall.

Some embodiments may construct a co-occurrence graph associated with users or various users within various demographic categories. In some embodiments, the nodes of such a graph may be geolocations visited by users, such as geofences, and the edges of the graph may indicate the probability of a user traveling from one node to another. In some cases, embodiments may detect that a user has traveled along a sequence of nodes in such a graph and inferred based on that sequence a next node that the user is likely to visit. Based on the inferred next node, some embodiments may predictively retrieve and send content related to the next predicted node to the user device to be presented to the user. In some cases, a user's weekend pattern may cause content pertaining to a place the user typically visits on the weekend to be predictively sent to the user. In some cases, a user's commute may register as a pattern and be used to identify offers corresponding to places along the route. Some embodiments may include a series of realtime event stream processing components and key value stores that facet a user's movements and patterns, categorizing them along with general user profile information to determine what the interest of the user is at that moment in time and predicting the likelihood of the interest in the near future in order to send location and time sensitive content, like offers, local news stories, microblog posts, restaurant recommendations, and the like.

The content may be sent and presented according to the techniques described above with reference to FIGS. 1-7.

In some cases, the process 800 may be repeated iteratively (e.g., periodically, like every 10 minutes), with each iteration identifying a relatively large number of events occurring over relatively large geographic area concurrently. For example, filtering, clustering, determining bounding areas, determining density of the clusters, determining density scores, and determining whether the density scores exceed a threshold may be done in parallel for each of the different segments, and in some cases for each of the different resulting clusters on different computing devices to expedite operations.

Figure 9:
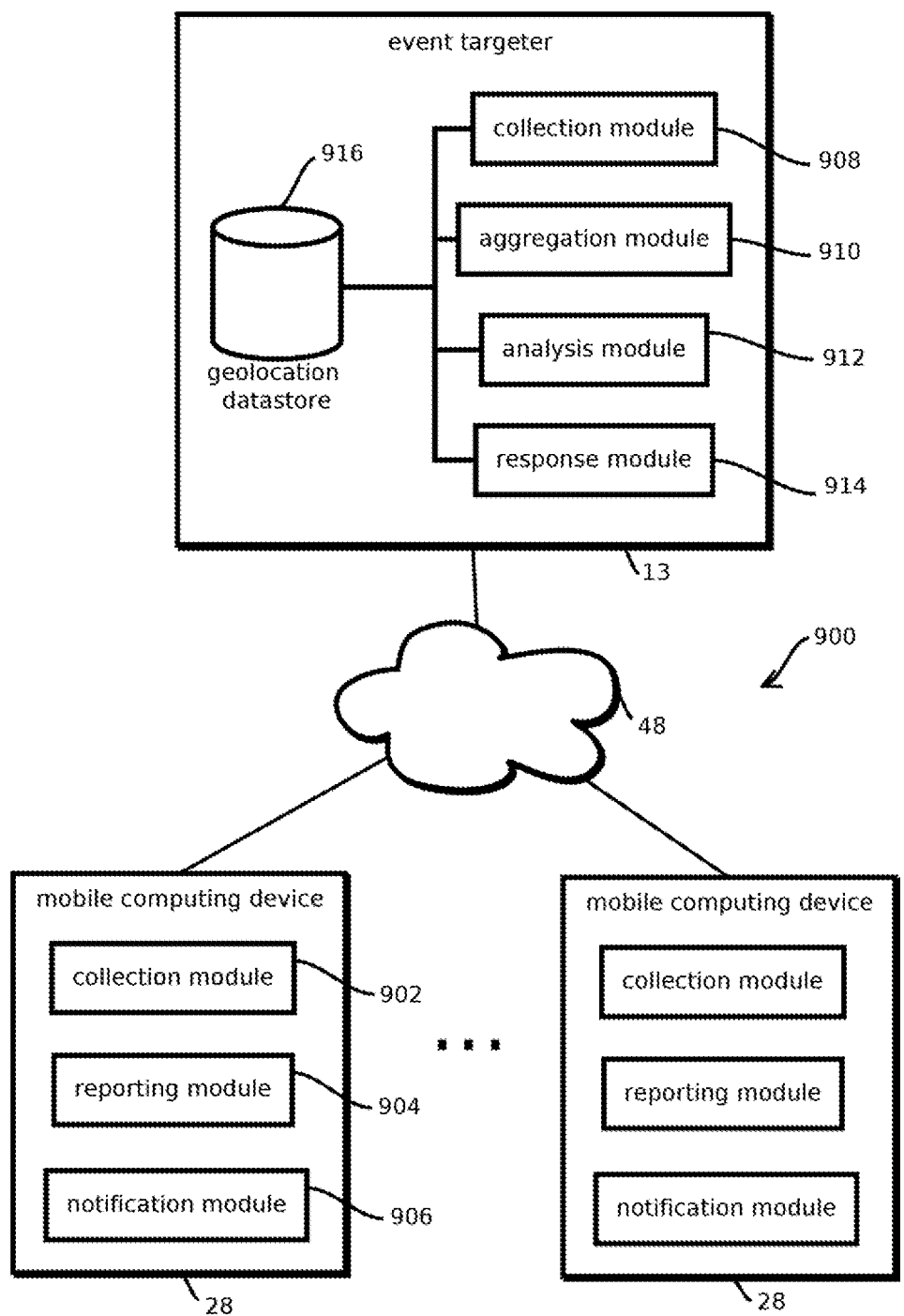
FIG. 9 is an example of a process to dynamically detect events in accordance with some embodiments.

FIG. 9 shows a computing environment 900 with more detailed excerpted portions of the systems described above with reference to FIG. 1. In some embodiments, the computing environment 900 includes the event targeter 13 (for example, within the content engine 12 described above) and a plurality of the mobile computing devices 28.

In some embodiments, the mobile computing devices 28 may execute an operating system having a native mobile application that includes a collection module 902, a reporting module 904, and a notification module 906. In some cases, the native mobile application may perform the steps described above to gather the data that is obtained by the event targeter 13.

In some embodiments, collection module 902 may collect the user's location and observe a significant change in location (e.g., moving more than a threshold distance, or detecting an event indicative of a relatively large change, like changing cell towers with which the device communicates). This functionality may be combined with other relevant information such as time near location and mode of transportation.

In some embodiments, the reporting module 904 may send the collected information (e.g., location and additional attributes) to the event targeter 13. The event targeter 13 may contact the device 28 synchronously or asynchronously, in some embodiments.

In some embodiments, notification module 906 may notify the user in a variety of manners depending on the device capacities, e.g., responsive to messages from the content engine 10. Examples include: push, email or in application or a triggered notification provided some criteria is met (such as leaving the area or after a certain delay).

In some embodiments, the event targeter 13 includes a collection module 908, an aggregation module 910, an analysis module 912, a response module 914, and a geolocation data store 916 that collectively effectuate the process 800 described above.

In some embodiments, the collection module 98 may receive events from multiple mobile computing devices 28 that contain location information and user preference information.

In some embodiments, the aggregation module 910 may aggregate the location information into the datastore 916, which may record historical locations based on reported geolocation over time.

In some embodiments, the analysis module 912 may determine whether the location is of interest based on a wide range of criteria. Some examples include density of users, time of day, user's likelihood of living in area, historical comparison based on day of week, time of year or known events in area as well as the individual users preferences and profile.

In some embodiments, the response module 914 may determine whether a user should be informed of something as a result of their location at that point in time. In some cases, the content engine 12 may responds with an action sent to the user's mobile computing device, which may result in a notification.

Thus, some embodiments may provide for geofencing or other geo-targeting of content without requiring employees or users to manually define areas in which the content is to be presented.

Figure 10:
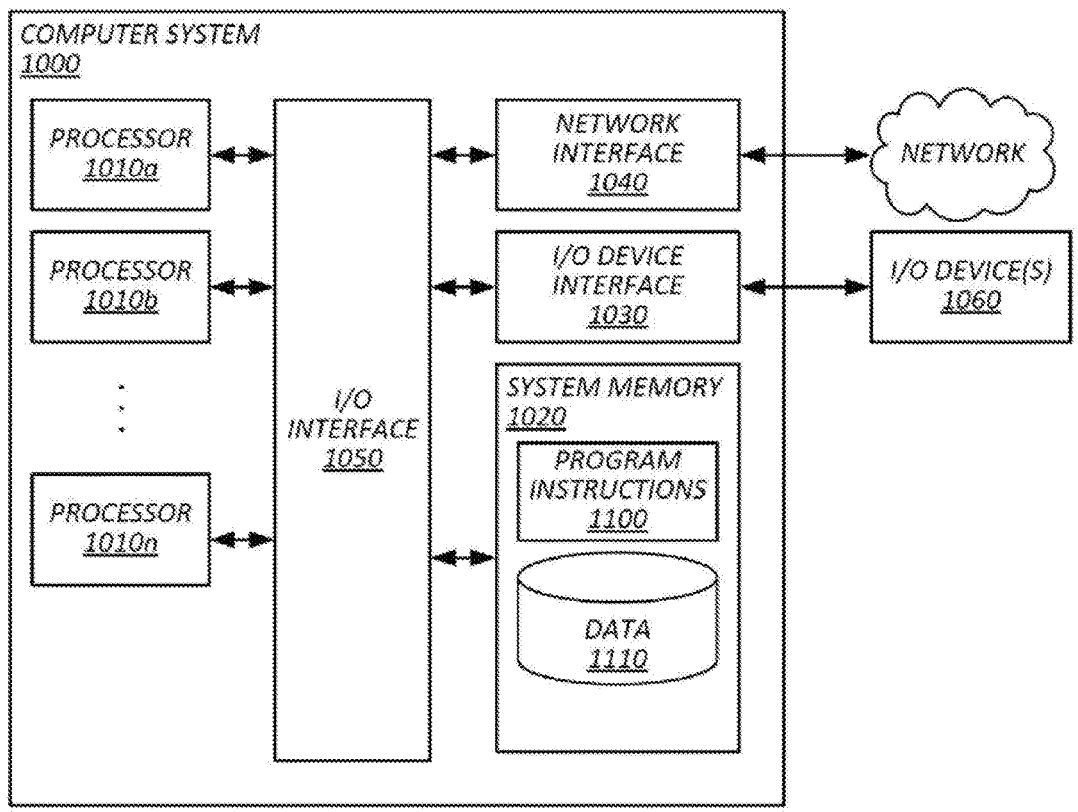
FIG. 10 is a block diagram of a computer in accordance with some embodiments.

FIG. 10 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims.

Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

What is claimed is:

1. A method of selectively providing content to computing devices based on geographic proximity to dynamically detected events drawing crowds, the method comprising:
    obtaining, with one or more computers, data indicative of current geolocations of more than 5,000 mobile computing devices based on information reported by an application executing on the mobile computing devices;
    inferring, with one or more computers, that an event with a crowd is occurring based on the data indicative of the geolocations indicating an amount of people and a proximity of the people;
    selecting, with one or more computers, content in response to the inference, wherein selecting content in response to the inference comprises:
        querying a business listing to obtain a web address of a business having a geographic location of the event with the crowd;
        crawling a website accessible through the web address to obtain one more web pages of the business;
        detecting unstructured natural language text indicative of a calendar or event listing in one of the web pages;
        extracting an event description from a data structure associated with the calendar or event listing; and
        selecting content based on a keyword appearing in the event description, the keyword being associated with the content in advance of the event; and
    sending, with one or more computers, the selected content to one or more user computing devices for presentation based on proximity between the one or more user computing devices and a geographic location of the event with the crowd.

2. The method of claim 1, wherein inferring that an event with a crowd is occurring comprises clustering the geolocations into a plurality of clusters based on geolocation and time.

3. The method of claim 2, wherein the clustering comprises:
for each of more than 50 geographic coordinates among the data indicative of current geolocations of more than 5,000 mobile computing devices:
determining that at least a first plurality of the geographic coordinates have more than a threshold amount of the geographic coordinates within a first threshold distance;
determining that a second plurality of the geographic coordinates, different from the first plurality of the geographic coordinates, are reachable from the first plurality of geographic coordinates, wherein the second plurality of the geographic coordinates are determined to be reachable, at least in part, by:
determining that each of the first plurality of geographic coordinates are within a second threshold distance of at least one of the other first plurality of geographic coordinates; and
determining that each of the second plurality of geographic coordinates is within a third threshold distance of at least one of the first plurality of geographic coordinates.

4. The method of claim 2, comprising:
segmenting at least some of the data indicative of current geolocations of more than 5,000 mobile computing devices according to geographic areas into a first segment and a second segment,
wherein clustering the geolocations comprises determining whether geolocations in the first segment form clusters without determining whether geolocations in the second segment form clusters with geolocations in the first segment.

5. The method of claim 1, wherein inferring that an event with a crowd is occurring comprises performing steps for clustering geolocations.

6. The method of claim 2, comprising:
accessing past data indicative of past geolocations of at least some of the mobile computing devices, the past data including geolocations having time stamps more than one day in the past;
determining that given geolocations among the data indicative of current geolocations appear more than a threshold amount in the past data in association with a respective corresponding mobile computing device; and
in response to the determination, excluding the given geolocations from clustering the geolocations into a plurality of clusters based on geolocation and time.

7. The method of claim 6, wherein determining that given geolocations among the data indicative of current geolocations appear more than a threshold amount in the past data in association with a respective corresponding mobile computing device comprises:
determining that at least one of the given geolocations for a given mobile computing device is within a threshold distance of a plurality of past geolocations of the given mobile computing device with greater than a threshold temporal frequency.

8. The method of claim 6, wherein determining that given geolocations among the data indicative of current geolocations appear more than a threshold amount in the past data in association with a respective corresponding mobile computing device comprises:
performing steps for determining whether a current geolocation is a routine geolocation of a user.

9. The method of claim 2, comprising:
for at least a given one of the plurality of clusters, determining a bounding geographic area of the given cluster at least in part by:
selecting a first geolocation among a plurality of geolocations constituting the given cluster;
selecting a second geolocation among the plurality of geolocations constituting the given cluster;
determining, based on an angle of a line extending between the first geolocation and the second geolocation, whether the line between the first geolocation and the second geolocation defines part of the bounding geographic area.

10. The method of claim 2, comprising:
for at least some of the plurality of clusters, performing steps for determining a bounding geographic area.

11. The method of claim 1, wherein inferring that an event with a crowd is occurring comprises:
obtaining, based on the data indicative of the geolocations, a measure of mobile-computing device geographic population density sensed by a given one of the mobile computing devices and a geolocation of the given mobile computing device.

12. The method of claim 11, wherein the measure of mobile-computing device geographic population density is based on an inventory of wireless beacons in range of the given mobile computing device.

13. The method of claim 11, wherein the measure of mobile-computing device geographic population density is determined based on an acoustic signal sensed by the given mobile computing device at least in part by:
determining features of the acoustic signal with a Fourier transform of the acoustic signal; and
classifying the acoustic signal as indicating crowd noise based on the features.

14. The method of claim 1, wherein inferring that an event with a crowd is occurring comprises:
clustering geolocations among the data indicative of current geolocations of more than 5,000 mobile computing devices;
determining a bounding geographic area of a resulting cluster;
determining a density of geolocations of the resulting cluster based on the bounding geographic area; and
determining that the density is greater than a threshold density.

15. The method of claim 1, wherein obtaining data indicative of current geolocations of more than 5,000 mobile computing devices based on information reported by an application executing on the mobile computing devices comprises:
receiving latitude and longitude coordinates determined based on wireless signals received by at least some of the mobile computing devices; and
determining that the latitude and longitude coordinates are fresher than a threshold age.

16. The method of claim 1, wherein inferring that an event with a crowd is occurring based on the data indicative of the geolocations indicating an amount of people and a proximity of the people comprises:
accessing a record of past events with crowds that have occurred at a given location corresponding to the inferred event with the crowd
inferring that the event with the crowd is occurring based on the record indicating a pattern of crowd formation.

17. The method of claim 1, comprising:
updating a profile of a business in a business listing based on attributes of the event.

18. The method of claim 1, wherein:
the application executing on the mobile computing devices comprises a native mobile application operative to receive the sent content and present a notification after receiving the sent content;
the data indicative of current geolocations of more than 5,000 mobile computing devices comprise time-stamped latitude and longitude coordinates obtained by querying an operating system of respective mobile computing devices with the native mobile application in response to determining that the mobile device has moved by more than a threshold amount;
inferring that an event with a crowd is occurring comprises performing steps for inferring that an event with a crowd is occurring; and
selecting content in response to the inference comprises performing steps for selecting content for an event.

19. A system, comprising:
one or more processors; and
memory storing instructions that when executed by at least some of the processors effectuate operations comprising:
obtaining data indicative of current geolocations of more than 5,000 mobile computing devices based on information reported by an application executing on the mobile computing devices;
inferring that an event with a crowd is occurring based on the data indicative of the geolocations indicating an amount of people and a proximity of the people;
selecting content in response to the inference, wherein selecting content in response to the inference comprises:
querying a business listing to obtain a web address of a business having a geographic location of the event with the crowd;
crawling a website accessible through the web address to obtain one more web pages of the business;
detecting unstructured natural language text indicative of a calendar or event listing in one of the web pages;
extracting an event description from a data structure associated with the calendar or event listing; and
selecting content based on a keyword appearing in the event description, the keyword being associated with the content in advance of the event; and
sending the selected content to one or more user computing devices for presentation based on proximity between the one or more user computing devices and a geographic location of the event with the crowd.

20. The system of claim 19, wherein inferring that an event with a crowd is occurring comprises clustering the geolocations into a plurality of clusters based on geolocation and time.

21. The system of claim 20, wherein the clustering comprises:
for each of more than 50 geographic coordinates among the data indicative of current geolocations of more than 5,000 mobile computing devices:
determining that at least a first plurality of the geographic coordinates have more than a threshold amount of the geographic coordinates within a first threshold distance;
determining that a second plurality of the geographic coordinates, different from the first plurality of the geographic coordinates, are reachable from the first plurality of geographic coordinates, wherein the second plurality of the geographic coordinates are determined to be reachable, at least in part, by:
determining that each of the first plurality of geographic coordinates are within a second threshold distance of at least one of the other first plurality of geographic coordinates; and
determining that each of the second plurality of geographic coordinates is within a third threshold distance of at least one of the first plurality of geographic coordinates.

22. The system of claim 20, comprising:
segmenting at least some of the data indicative of current geolocations of more than 5,000 mobile computing devices according to geographic areas into a first segment and a second segment,
wherein clustering the geolocations comprises determining whether geolocations in the first segment form clusters without determining whether geolocations in the second segment form clusters with geolocations in the first segment.

23. The system of claim 19, wherein inferring that an event with a crowd is occurring comprises performing steps for clustering geolocations.

24. The system of claim 20, the operations comprising:
accessing past data indicative of past geolocations of at least some of the mobile computing devices, the past data including geolocations having time stamps more than one day in the past;
determining that given geolocations among the data indicative of current geolocations appear more than a threshold amount in the past data in association with a respective corresponding mobile computing device; and
in response to the determination, excluding the given geolocations from clustering the geolocations into a plurality of clusters based on geolocation and time.

25. The system of claim 24, wherein determining that given geolocations among the data indicative of current geolocations appear more than a threshold amount in the past data in association with a respective corresponding mobile computing device comprises:
determining that at least one of the given geolocations for a given mobile computing device is within a threshold distance of a plurality of past geolocations of the given mobile computing device with greater than a threshold temporal frequency.

26. The system of claim 24, wherein determining that given geolocations among the data indicative of current geolocations appear more than a threshold amount in the past data in association with a respective corresponding mobile computing device comprises:
performing steps for determining whether a current geolocation is a routine geolocation of a user.

27. The system of claim 20, the operations comprising:
for at least a given one of the plurality of clusters, determining a bounding geographic area of the given cluster at least in part by:
selecting a first geolocation among a plurality of geolocations constituting the given cluster;
selecting a second geolocation among the plurality of geolocations constituting the given cluster;
determining, based on an angle of a line extending between the first geolocation and the second geolocation, whether the line between the first geolocation and the second geolocation defines part of the bounding geographic area.

28. The system of claim 20, the operations comprising:
for at least some of the plurality of clusters, performing steps for determining a bounding geographic area.

29. The system of claim 19, wherein inferring that an event with a crowd is occurring comprises:
obtaining, based on the data indicative of the geolocations, a measure of mobile-computing device geographic population density sensed by a given one of the mobile computing devices and a geolocation of the given mobile computing device.

30. The system of claim 29, wherein the measure of mobile-computing device geographic population density is based on an inventory of wireless beacons in range of the given mobile computing device.

31. The system of claim 29, wherein the measure of mobile-computing device geographic population density is determined based on an acoustic signal sensed by the given mobile computing device at least in part by:
determining features of the acoustic signal with a Fourier transform of the acoustic signal; and
classifying the acoustic signal as indicating crowd noise based on the features.

32. The system of claim 19, wherein inferring that an event with a crowd is occurring comprises:
clustering geolocations among the data indicative of current geolocations of more than 5,000 mobile computing devices;
determining a bounding geographic area of a resulting cluster;
determining a density of geolocations of the resulting cluster based on the bounding geographic area; and
determining that the density is greater than a threshold density.

33. The system of claim 19, wherein obtaining data indicative of current geolocations of more than 5,000 mobile computing devices based on information reported by an application executing on the mobile computing devices comprises:
receiving latitude and longitude coordinates determined based on wireless signals received by at least some of the mobile computing devices; and
determining that the latitude and longitude coordinates are fresher than a threshold age.

34. The system of claim 19, wherein inferring that an event with a crowd is occurring based on the data indicative of the geolocations indicating an amount of people and a proximity of the people comprises:
accessing a record of past events with crowds that have occurred at a given location corresponding to the inferred event with the crowd
inferring that the event with the crowd is occurring based on the record indicating a pattern of crowd formation.

35. The system of claim 19, the operations comprising:
updating a profile of a business in a business listing based on attributes of the event.

36. The system of claim 19, wherein:
the application executing on the mobile computing devices comprises a native mobile application operative to receive the sent content and present a notification after receiving the sent content;
the data indicative of current geolocations of more than 5,000 mobile computing devices comprise time-stamped latitude and longitude coordinates obtained by querying an operating system of respective mobile computing devices with the native mobile application in response to determining that the mobile device has moved by more than a threshold amount;
inferring that an event with a crowd is occurring comprises performing steps for inferring that an event with a crowd is occurring; and
selecting content in response to the inference comprises performing steps for selecting content for an event.

* * * * *